US011188652B2

(12) United States Patent
Barkan

(10) Patent No.: US 11,188,652 B2
(45) Date of Patent: *Nov. 30, 2021

(54) ACCESS MANAGEMENT AND CREDENTIAL PROTECTION

(71) Applicant: Mordecai Barkan, Palo Alto, CA (US)

(72) Inventor: Mordecai Barkan, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,848

(22) Filed: Apr. 27, 2017

(65) Prior Publication Data
US 2017/0235955 A1    Aug. 17, 2017

Related U.S. Application Data

(63) Continuation-in-part of application No. 14/606,992, filed on Jan. 27, 2015, now Pat. No. 9,672,360, which is a continuation-in-part of application No. 14/040,352, filed on Sep. 27, 2013, now Pat. No. 9,092,628.

(60) Provisional application No. 61/744,677, filed on Oct. 2, 2012, provisional application No. 61/965,313, filed on Jan. 28, 2014.

(51) Int. Cl.
| G06F 21/00 | (2013.01) |
| G06F 21/57 | (2013.01) |
| G06F 21/32 | (2013.01) |
| G06F 21/31 | (2013.01) |
| H04L 29/06 | (2006.01) |

(52) U.S. Cl.
CPC ............. *G06F 21/57* (2013.01); *G06F 21/31* (2013.01); *G06F 21/32* (2013.01); *H04L 63/0853* (2013.01); *G06F 2221/034* (2013.01); *H04L 63/14* (2013.01)

(58) Field of Classification Search
CPC . H04L 63/0263; H04L 63/0227; H04L 63/02; H04L 63/029; H04L 63/0209
See application file for complete search history.

(56) References Cited

U.S. PATENT DOCUMENTS

| 4,004,277 A | * | 1/1977 | Gavril ................. G06F 13/4022 |
| | | | 710/23 |
| 4,173,893 A | | 11/1979 | Hedrick |
| 4,253,764 A | | 3/1981 | Morrill |
| 4,757,747 A | | 7/1988 | Blatter et al. |

(Continued)

FOREIGN PATENT DOCUMENTS

| DE | 102011012227 A1 | 8/2012 |
| DE | 102011122273 A1 | 6/2013 |

(Continued)

OTHER PUBLICATIONS

Architectural Enhancements to Increase Trust in Cyber-Physical Systems Containing Untrusted Software and Hardware| Mohammed M. Farag|Sep. 17, 2012|pp. 1-217 (Year: 2012).*

(Continued)

*Primary Examiner* — Mahfuzur Rahman

(57) ABSTRACT

Secure computer architectures, systems, and applications are provided herein. An exemplary system includes a legacy environment which is an off-the-shelf computing system, a trusted environment device that communicates with a network, and at least one peripheral that is communicatively coupled with the trusted environment device or having an authentication module.

7 Claims, 20 Drawing Sheets

(56) References Cited

U.S. PATENT DOCUMENTS

| | | | |
|---|---|---|---|
| 4,758,714 A | 7/1988 | Carlson et al. | |
| 5,233,512 A | 8/1993 | Gutz et al. | |
| 5,237,816 A | 8/1993 | Duffy et al. | |
| 5,384,697 A | 1/1995 | Pascucci | |
| 5,442,290 A | 8/1995 | Crooks | |
| 5,482,314 A | 1/1996 | Corrado et al. | |
| 5,493,503 A | 2/1996 | Richards et al. | |
| 5,606,311 A | 2/1997 | Polidan et al. | |
| 5,637,974 A | 6/1997 | McCann | |
| 5,721,374 A | 2/1998 | Siekkinen et al. | |
| 5,742,756 A | 4/1998 | Dillaway et al. | |
| 5,790,391 A | 8/1998 | Stich et al. | |
| 5,963,447 A | 10/1999 | Kohn et al. | |
| 6,088,689 A | 7/2000 | Kohn et al. | |
| 6,289,462 B1 | 9/2001 | McNabb et al. | |
| 6,321,337 B1* | 11/2001 | Reshef | G06F 21/53 726/14 |
| 6,574,234 B1 | 6/2003 | Myer et al. | |
| 6,630,942 B2 | 10/2003 | Gerra et al. | |
| 6,651,171 B1 | 11/2003 | England et al. | |
| 6,895,502 B1 | 5/2005 | Fraser | |
| 7,289,964 B1* | 10/2007 | Bowman-Amuah | G06F 9/5038 705/1.1 |
| 7,484,008 B1 | 1/2009 | Gelvin et al. | |
| 7,541,920 B2 | 6/2009 | Tambascio et al. | |
| 7,593,530 B2* | 9/2009 | Karaoguz | H04L 63/083 380/258 |
| 7,685,281 B1 | 3/2010 | Saraiya et al. | |
| 7,716,720 B1* | 5/2010 | Marek | G06F 21/74 726/2 |
| 7,942,844 B2 | 5/2011 | Moberg et al. | |
| 8,073,008 B2 | 12/2011 | Mehta et al. | |
| RE43,103 E | 1/2012 | Rozman et al. | |
| 8,149,102 B1 | 4/2012 | Miller et al. | |
| 8,151,324 B2 | 4/2012 | Burch et al. | |
| RE43,500 E | 7/2012 | Rozman et al. | |
| 8,214,653 B1* | 7/2012 | Marr | G06F 21/572 713/189 |
| 8,627,414 B1 | 1/2014 | McCune et al. | |
| 8,640,194 B2* | 1/2014 | Inoue | G06F 21/52 713/182 |
| 8,649,770 B1* | 2/2014 | Cope | H04W 12/02 455/411 |
| 8,782,222 B2 | 7/2014 | Luna et al. | |
| 8,909,930 B2* | 12/2014 | Winslow | H04L 9/3234 713/168 |
| 9,036,509 B1 | 5/2015 | Addepalli et al. | |
| 9,092,628 B2 | 7/2015 | Barkan | |
| 9,210,576 B1* | 12/2015 | Cope | H04W 12/08 |
| 9,268,959 B2 | 2/2016 | Paczkowski et al. | |
| 9,342,695 B2 | 5/2016 | Barkan | |
| 9,614,839 B2 | 4/2017 | Barkan | |
| 9,672,360 B2 | 6/2017 | Barkan | |
| 9,781,141 B2 | 10/2017 | Barkan | |
| 9,898,732 B2* | 2/2018 | Murphy | G06Q 20/3224 |
| 10,387,871 B2* | 8/2019 | Hammad | G06Q 20/12 |
| 10,496,824 B2* | 12/2019 | Raj | G06F 21/53 |
| 2002/0103613 A1 | 8/2002 | Maher et al. | |
| 2002/0111946 A1 | 8/2002 | Fallon | |
| 2002/0152393 A1* | 10/2002 | Thoma | H04L 63/0435 713/189 |
| 2003/0025599 A1 | 2/2003 | Monroe | |
| 2003/0030795 A1 | 2/2003 | Swan et al. | |
| 2003/0033032 A1* | 2/2003 | Lind | G01D 9/005 700/52 |
| 2003/0093187 A1 | 5/2003 | Walker | |
| 2003/0160714 A1 | 8/2003 | Yoshinaga | |
| 2004/0008253 A1 | 1/2004 | Monroe | |
| 2004/0056765 A1 | 3/2004 | Anderson et al. | |
| 2004/0075566 A1 | 4/2004 | Stepanik et al. | |
| 2004/0098595 A1* | 5/2004 | Aupperle | H04L 63/083 713/185 |
| 2004/0112122 A1 | 6/2004 | Steward | |
| 2004/0252053 A1 | 12/2004 | Harvey | |
| 2004/0268135 A1 | 12/2004 | Zimmer et al. | |
| 2005/0080527 A1 | 4/2005 | Tao et al. | |
| 2005/0177631 A1 | 8/2005 | Bahl et al. | |
| 2005/0288877 A1 | 12/2005 | Doig et al. | |
| 2006/0010134 A1 | 1/2006 | Davis et al. | |
| 2006/0107328 A1 | 5/2006 | Frank et al. | |
| 2006/0132822 A1 | 6/2006 | Walmsley | |
| 2007/0067844 A1 | 3/2007 | Williamson et al. | |
| 2007/0073426 A1 | 3/2007 | Chand | |
| 2007/0078537 A1 | 4/2007 | Chand et al. | |
| 2007/0079012 A1 | 4/2007 | Walker | |
| 2007/0084193 A1 | 4/2007 | Levin | |
| 2007/0147619 A1 | 6/2007 | Bellows et al. | |
| 2007/0189308 A1 | 8/2007 | Tchigevsky et al. | |
| 2007/0289288 A1 | 12/2007 | Dawson et al. | |
| 2008/0005794 A1* | 1/2008 | Inoue | G06F 21/56 726/22 |
| 2008/0014867 A1 | 1/2008 | Finn | |
| 2008/0130895 A1* | 6/2008 | Jueneman | H04L 9/3066 380/277 |
| 2008/0263365 A1* | 10/2008 | Aupperle | H04L 63/0815 713/185 |
| 2008/0281472 A1* | 11/2008 | Podgorny | G05B 15/02 700/276 |
| 2008/0312790 A1 | 12/2008 | Fey et al. | |
| 2009/0094439 A1 | 4/2009 | Mansell et al. | |
| 2009/0125895 A1 | 5/2009 | Majoros | |
| 2009/0164770 A1 | 6/2009 | Zimmer et al. | |
| 2009/0169020 A1* | 7/2009 | Sakthikumar | G06F 21/57 380/278 |
| 2009/0220080 A1 | 9/2009 | Herne et al. | |
| 2009/0249053 A1 | 10/2009 | Zimmer et al. | |
| 2009/0307142 A1 | 12/2009 | Mardikar | |
| 2010/0005531 A1 | 1/2010 | Largman et al. | |
| 2010/0031325 A1* | 2/2010 | Maigne | G06F 9/45533 726/4 |
| 2010/0151817 A1 | 6/2010 | Lidstrom et al. | |
| 2010/0246287 A1 | 9/2010 | Vigoda et al. | |
| 2010/0281273 A1 | 11/2010 | Lee et al. | |
| 2011/0093938 A1* | 4/2011 | Asokan | H04L 63/061 726/7 |
| 2011/0197188 A1 | 8/2011 | Srinivasan et al. | |
| 2011/0320823 A1 | 12/2011 | Saroiu et al. | |
| 2012/0030731 A1 | 2/2012 | Bhargava et al. | |
| 2012/0102334 A1 | 4/2012 | OLoughlin et al. | |
| 2012/0159156 A1 | 6/2012 | Barham et al. | |
| 2012/0161924 A1* | 6/2012 | Lin | H04L 63/0853 340/5.8 |
| 2012/0215956 A1 | 8/2012 | Zeng et al. | |
| 2012/0271686 A1 | 10/2012 | Silverman | |
| 2012/0278600 A1* | 11/2012 | Mese | G06F 9/4401 713/2 |
| 2012/0331550 A1* | 12/2012 | Raj | G06F 21/575 726/22 |
| 2013/0111211 A1* | 5/2013 | Winslow | G06F 21/57 713/171 |
| 2013/0166552 A1 | 6/2013 | Rozenwald et al. | |
| 2014/0096226 A1 | 4/2014 | Barkan | |
| 2014/0280520 A1 | 9/2014 | Baier et al. | |
| 2015/0067864 A1 | 3/2015 | Barkan | |
| 2015/0095918 A1 | 4/2015 | Alameldeen et al. | |
| 2015/0143482 A1 | 5/2015 | Barkan | |
| 2015/0178478 A1* | 6/2015 | Kocher | G06F 21/10 726/26 |
| 2015/0312253 A1 | 10/2015 | Barkan | |
| 2016/0191555 A1 | 6/2016 | Barkan | |
| 2017/0054594 A1 | 2/2017 | Decenzo et al. | |
| 2017/0070361 A1 | 3/2017 | Sundermeyer et al. | |
| 2017/0070563 A1 | 3/2017 | Sundermeyer et al. | |
| 2017/0337145 A1 | 11/2017 | Rozas et al. | |
| 2017/0346840 A1 | 11/2017 | Barkan | |

(56) References Cited

U.S. PATENT DOCUMENTS

| | | |
|---|---|---|
| 2018/0197387 A1 | 7/2018 | Dawes |
| 2019/0158304 A1 | 5/2019 | Sundermeyer et al. |

FOREIGN PATENT DOCUMENTS

| | | |
|---|---|---|
| EP | 1161715 A1 | 12/2001 |
| EP | 1901145 A2 | 3/2008 |
| EP | 2904743 A2 | 8/2015 |
| EP | 3058702 A2 | 8/2016 |
| EP | 2904743 B1 | 9/2017 |
| EP | 3058702 B1 | 2/2020 |
| NO | WO2000016206 A1 | 3/2000 |
| WO | WO2014055372 A2 | 4/2014 |
| WO | WO2015102730 A2 | 7/2015 |

OTHER PUBLICATIONS

Continuation of U: https://vtechworks.lib.vt.edu/bitstream/handle/10919/29084/Farag_MM_D_2012.pdf?sequence=1&isAllowed=y (Year: 2012).* nternational Search Report and Written Opinion dated Apr. 15, 2014 in Patent Cooperation Treaty Application No. PCT/US2013/062420, filed Sep. 27, 2013, 41 pages.

"ARM Security Technology: Building a Secure System using TrustZone Technology; PRD29-GENC-009492C; 2009, 108 pages."

Ramasubramanian, Rahul. Exploring Virtualization Platforms for ARM-based Mobile Android Devices; 2011, 62 pages.

Greene, James. Intel Trusted Execution Technology: Hardware-based Technology for Enhancing Server Platform Security. 2012, 8 pages.

Strongin, Geoffrey. Trusted computing using AMD "Pacifica" and "Presidio" secure virtual machine technology. Information Security Technical Report (2005) 10, pp. 120-132.

Santos et al. Towards trusted cloud computing. Proceedings of the 2009 conference on Hot topics in cloud computing. 2009. https://www.usenix.org/legacy/event/hotcloud09/tech/full_papers/santos.pdf, 5 pages.

International Search Report and Written Opinion dated Jul. 6, 2015 in Patent Cooperation Treaty Application No. PCT/US2014/061235, filed Oct. 17, 2014, 19 pages.

Perrig et al. SPINS: Security Protocols for Sensor Networks, Wireless Networks, vol. 8, 521-534. 2002. http://www.csee.umbc.edu/courses/graduate/CMSC691A/Spring04/papers/spins-wine-journal.pdf.

Hartig et al. The Nizza-Secure System Architecture, CollaborateCom 2005, pp. 1-10.

Extended European Search Report dated Apr. 21, 2016 in European Patent Application No. 13844473.2 filed Sep. 27, 2013, 5 pages.

Steinberg, Udo et al., "NOVA: A Microhypervisor-Based Secure Virtualization Architecture", EuroSys ' 10, Apr. 13-16, 2010, pp. 209-222.

Sadeghi, Ahmad-Reza et al., "Enabling Fairer Digital Rights Management with Trusted Computing," Horst-Gortz-Institute for IT-Security, Ruhr-University Bochum, Germany 2007, pp. 53-70.

"Notice of Allowance", European Patent Application No. 13844473.2, dated Mar. 15, 2017, 6 pages.

Gilbert, Peter et al. "YouProve," Proceedings of the 9th ACM Conference on Embedded Networked Sensor Systems, Sensys '11, vol. 11, Jan. 1, 2011, pp. 176-189.

"Extended European Search Report", European Patent Application No. 14877192.6, dated May 3, 2017, 8 pages.

"Office Action", European Patent Application No. 14877192.6, dated Jun. 18, 2018, 5 pages.

"Office Action", European Patent Application No. 14877192.6, dated Jan. 30, 2019, 5 pages.

"Notice of Allowance", European Patent Application No. 14877192.6, dated Sep. 9, 2019, 6 pages.

Brown et al., "Software Updating in Wireless Sensor Networks", Journal of Sensor and Actuator Networks, <URL: https://www.researchgate.net/publication/284442111_Software_Updatingjn_Wireless_Sensor _Networks_A_Survey_and_Lacunae>, Nov. 14, 2013, 46 Pages.

* cited by examiner

ACCESS MANAGEMENT AND CREDENTIAL PROTECTION

CROSS REFERENCE TO RELATED APPLICATIONS

This Non-Provisional Patent Applications is a continuation-in-part of U.S. patent application Ser. No. 14/606,992, filed on Jan. 27, 2015 and titled "Secure Computer Architectures, Systems, and Applications," which is a continuation-in-part of U.S. patent application Ser. No. 14/040,352, filed on Sep. 27, 2013 and titled "Secure Computer Architectures, Systems, and Applications," now U.S. Pat. No. 9,092,628, issued on Jul. 28, 2015, which claims the priority benefit of U.S. Provisional Application Ser. No. 61/744,677, filed on Oct. 2, 2012 and titled "Computer Architecture, System and Applications." U.S. patent application Ser. No. 14/606,992, filed on Jan. 27, 2015 and titled "Secure Computer Architectures, Systems, and Applications," also claims the benefit and priority of U.S. Provisional Patent Application Ser. No. 61/965,313 filed on Jan. 28, 2014 and titled "Add-on To Existing Computing Systems to Enhance Their Security." All of the aforementioned are hereby incorporated by reference herein in their entireties, including all references cited therein.

FIELD OF THE TECHNOLOGY

Embodiments of the disclosure relate to computer security. More specifically, but not by way of limitation, the present technology provides secure computing architectures, systems, and applications. In some embodiments, the present technology employs both trusted and legacy hardware environments that protect sensitive user information and increase data security, privacy, and safety.

SUMMARY OF THE DISCLOSURE

According to some embodiments, the present technology is directed to a system, comprising: (a) a legacy environment comprising an off-the-shelf computing system; (b) a trusted environment device that communicates with a network and the legacy environment; and (c) at least one peripheral is communicatively coupled with the trusted environment device or comprising an authentication module.

According to other embodiments, the present technology is directed to a system, comprising: (a) a mobile computing device; and (b) a trusted environment device that can communicatively couple with the mobile computing device, the trusted environment device being configured to communicate with a network which the mobile computing device is attempting to access, the trusted environment device preventing the mobile computing device from executing a malicious attack on the network.

According to additional embodiments, the present technology is directed to a corporate network, comprising: (a) a corporate administrator system and a corporate server providing a corporate network; (b) a plurality of end user computing systems that couple to the corporate network; and (c) the corporate administrator system, the corporate server, and each of the plurality of end user computing systems comprising a trusted environment device, the trusted environment device being configured to: (i) communicate with the corporate network; and (ii) prevent the execution of a malicious attack on the corporate network.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that can be readily apparent to those of ordinary skill in the art having the benefit of the description herein.

DETAILED DESCRIPTION

Figure 1:
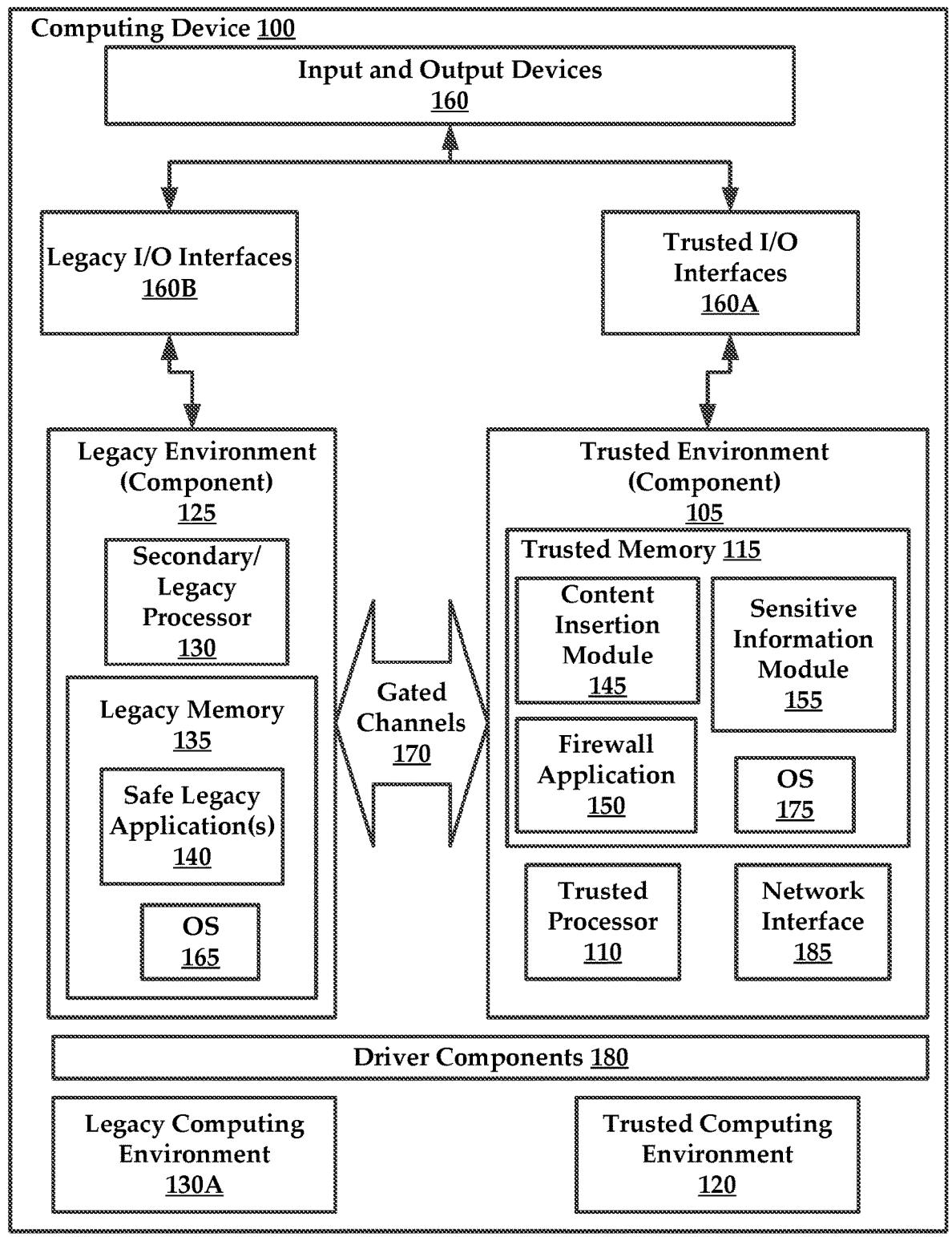
FIG. 1 is an exemplary computing device having a trusted environment and a legacy environment, the computing device being constructed in accordance with the present disclosure.

In the following description, for purposes of explanation, numerous specific details are set forth in order to provide a thorough understanding of the disclosure. It can be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It can be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Advantageously, the present technology remedies the vulnerability of existing computing device, for example, legacy computers such as personal computers (PCs), notebooks, smartphones, and so forth. Vulnerabilities are caused by placing the processor and operating system (OS) of the computing device as the central computing component, which is exposed to each operation executed by the computing device.

Further, it is difficult, if not impossible to protect these legacy systems when a user encounters or downloads malware into the system. In non-limiting examples, malware may masquerade as a legitimate user by copying authentication information of the user, often without their knowledge. Also, the malware may transfer information to remote locations and expose sensitive information of the user to fraudsters. The above scenario is merely exemplary and many types of malware such as spoofing, phishing, Trojan horses, man-in-the-browser attacks, and other fraud-driven or malicious activities that would be known to one of ordinary skill in the art are also remedied by the present technology.

Indeed, these vulnerabilities may be overcome by abandoning a single CPU (processor and OS) computing architecture. The present technology contemplates computing architectures, systems, and devices that include a plurality of computing environments that are physically and/or logically separated from one another in such a way that the security, privacy, and safety of the users sensitive information is preserved.

As is used throughout this disclosure, the term "sensitive information" may include any information that is input into, processed by, output from, or transmitted by a computing device that impacts the security, privacy, or safety of a user or device. Sensitive information may be understood to include personal information, personally identifiable information, intellectual property, or any other information that could be used in a malicious manner, which would be known to one of ordinary skill in the data privacy and data security arts. Exemplary and non-limiting examples of sensitive information can be described in greater detail infra, with reference to various exemplary use cases for the present technology.

In some embodiments, the present technology may be embodied in a computing device that provides a trusted computing environment and one or more legacy computing environments. The trusted computing environment is generated by a trusted environment/component, which contains a hardware portion such as a central processing unit (CPU) and a software portion having an OS, application program interface (API)/drivers, and optional trusted applications, which will be described in greater detail herein.

A legacy environment/component is similar in structure to a conventional computing architecture and system, and generates a legacy computing environment. A more complete description of an exemplary legacy computing device is described with reference to FIG. 6, which is described infra. In general, the legacy environment contains a hardware portion such as a central processing unit (CPU) and a software portion having an OS, API/drivers, and one or more applications. In some embodiments, the legacy computing device may execute one or more safe applications (e.g., applications from trusted sources).

The present technology leverages the use of more than one CPU in a single computing device to create a trusted computing environment, which is physically separated from a legacy computing environment. The trusted environment is tasked with managing, monitoring, and controlling, of the global operation of the computing device, as well as the operations of the legacy computing environment. The trusted computing environment is protected from malware downloaded to, or executed within, the legacy environment(s) of the computing device due to the physical separation between the trusted and legacy hardware. In some instances, all downloads of content from a network occur in the legacy environment.

At least a portion (or potentially all) administrative tasks of the computing device can be carried out within the trusted computing environment such as managing all or some of the APIs of the I/O devices. Exemplary input devices include a keyboard, mouse, touch screens, GPS modules, modems (wireless and wired), camera, microphones, biometric sensors, joy sticks, and other similar I/O devices that would be known to one of ordinary skill in the art. Exemplary output devices include, but are not limited to, displays, speakers, and similar devices that manage, all or some of portion of the memory or mass storage of the computing device, such as disk and other memory storage devices. The trusted computing environment also all or a portion of the sensitive information utilized by the computing device such as authentication data, usernames/passwords, account numbers, email lists, file directories, favorites, "start menu settings", encryption keys, private information, and so forth. This sensitive information may reside in the trusted environment of the system, on a user held storage device, or on a network or network device.

The trusted computing environment may process all or some of the user input information, received from various input devices, to the legacy computing environment. The trusted computing environment may monitor and control the access of the legacy computing environment to all or some of the output devices such as the displays, speakers, memory devices (e.g., disks, memory sticks, Digital Video Disks (DVDs)), USB ports, and any network devices or computing devices that are external to the computing device of the present technology.

In some embodiments, a single trusted computing environment may control several legacy computing environments. The trusted environment may have network access through a network interface that utilizes a static or dynamically assigned Internet Protocol (IP) address. This IP address is not known or utilized by the legacy computing environment for security and privacy purposes.

Data transmitting through a network interface on IP addresses that are used by a legacy computing environment may be controlled and monitored by the trusted environment. The combined trusted/legacy architecture prevents a legacy computing environment from modifying or altering portions of the trusted computing environment. A certain implementation, for example, may include a legacy environment that runs safe applications such as word processing applications, spreadsheet applications, and web browser clients, all of which are preferably created by reputable entities.

It will be understood that the legacy computing environment itself is treated as non-trusted, by the trusted computing environment. A second legacy computing environment may execute other applications, such as those downloaded from a network, in order to minimize damage to the computing device that may be caused by malware downloaded from the network. That is, only the legacy environment may be damaged by the execution of non-trusted applications since it is the only part of the computing device that can be infected. Indeed, in some embodiments, one or more legacy computing environments may execute within another legacy computing environment.

The trusted environment and the legacy environment that runs the safe applications may not be infected, particularly if the two legacy environments are not executed by the same processor that provides the trusted environment, namely the trusted processor.

A trusted computing environment may be a simple computing environment with only limited functionality. In some instances the operations of the trusted environment are not modifiable. In other instances, the trusted computing environment may be layered and provide one or more fixed parts, and may be modifiable to some extent. Regardless of the modifiability of the trusted computing environment, it is advantageous to prevent the trusted computing environment from being modified by a legacy computing environment. In some instances, modification of the trusted environment may be allowed by a remote network resource, such as the trusted computing environment of another computing device, such as a web server, that has been verified as a trusted entity. In any case the trusted environment is limited in accessibility to the network, for example to a single site on the Internet.

In some instances, authentication of a user can be carried in the trusted environment. Having the owner of the computing device as the administrator and user may simplify the use of the computing device. Optionally, additional users may be allowed access to the computing device only by the owner. In some instances users with external devices, such as a USB memory stick may be allowed to interface directly with the trusted computing environment and use the computing device.

In general, all login actions for such access as virtual private network (VPN), web-based email service, social networks, websites, web-based accounts, other external computing devices, and so forth can be carried out in the trusted computing environment without exposure of such sensitive information to the legacy computing environment. In some instances, the trusted computing environment may utilize biometric identifiers to identify a user.

In some instances, the trusted computing environment includes a trusted browser client that operates entirely within the trusted computing environment. The browser client may utilize the secure and dedicated network interface and/or IP address of the trusted computing environment.

In some embodiments, if malware is executed in the legacy computing environment, attempts by the malware to operate as the user can be tested by the trusted environment which evaluates user actions. By way of example, if the user keys by means of the keyboard, a password to be used with a network entity (such as Internet site or corporate server) without a communication of such site, such actions may be indicative of malware presence and the password string of characters will blocked from accessing the legacy environment. Furthermore, the malware operation may be tested by messaging the user and by providing a coded string (process called seeding) that will allow future identification of future use of the fake password by a hackers or such, which could point at machine, user, time and other data, that will help in tracing, locating, and containing the malware source. By way of example, if a key stroke is emulated by the malware such keystrokes can be identified by the trusted computing environment as a malware initiation and not a user key stroke. For example, the trusted environment may know that a keystroke could not have been executed by the user. As result the action could be denied or redirected by the trusted computing environment.

The present technology can also provide protection to peripheral devices that rely on private or secret codes, such as network switches and routers or any other device that a hacker might attempt to gain control of using credentials of the user. The present technology allows both the credentials and operating control of the switch/router to reside within the trusted computing environment, shielded from the legacy computing environment(s) in which the malware resides.

Exemplary computing devices that may incorporate and utilize the present technology include, but are not limited to robots, satellites, components of communication systems, smart sensors, machine-to-machine devices, although any computing device or system that utilizes a processor and memory may likewise benefit from the present technology.

The combined use of the trusted and legacy computing environments ensures that hacking attempts execute and terminate within in the legacy computing environment. Thus, legacy computing environments may be structured with full featured modified copies of the administrative components used by typical legacy systems. The legacy computing environment may be allowed by the trusted computing environment to masquerade as an unprotected computer. Using the legacy computing environment as a foil, the trusted computing environment can seed a hacker with false information that can allow the hacker to be tracked and identified.

Information that can be seeded may include, but is not limited to user identifiers, passwords, account numbers, email addresses, corrupted files, malware, and more. Keyboard strokes can be modified and fed to the legacy computing environment, as well as mouse positions, images, biometric data and any other input and/or output signals. Thus, the information that the hacker obtains and uses, such as user identifiers or email addresses, can identify the computing device that has been infiltrated, time of action as well as the hacker's computing device. With regard to a time of action, the trusted environment may be configured to identify a time of action for operations occurring within a legacy environment. These operations may be time stamped by the trusted environment. When a malicious event within the legacy environment is suspected or identified, operations occurring around the time of the suspected or confirmed event may be evaluated and interpreted by the trusted environment or a central site.

In some instances, hardware modifications to the computing device may be incorporated as an integrated circuit (IC) that encompasses the legacy CPU(s) and some of the hardware separation of the trusted from the legacy computing environments is implemented at the device level. IC manufacturers may redesign their devices to implement the present technology and reduce the cost of such implementation. With respect to the shielding portions of a computing device from the legacy computing environments, such as video devices and audio devices, may be designed with separate inputs that are dedicated for a trusted computing environment and some that are dedicated for a legacy computing environment. Indeed, the devices may be designed to prevent legacy computing environments from having access to critical information displayed, processed, and/or output by the device.

The present technology may likewise be utilized with network components to provide secure web services, network monitoring, and secure cloud development environment allowing for the gathering of information from a multitude of users, early discovery of threats, certification, anti-hacking means (e.g., avoidance, tracking, study hacking attempts, identify sources of threats, defeating, and retaliating), and other similar features. Since the user serves as a contact end between the trusted and legacy computing environments, the network may serve as the other contact point. The trusted computing environment may channel all network-based communications through the monitoring site, which itself includes a trusted computing environment.

Software components of the present technology may include operating systems and trusted and legacy applications, which may be optimized to execute with the computing devices of the present technology. Specialized tools may be developed to program and test such software. For example, a computing device of the present technology may be utilized as a simulator or emulator. To explain the changes that can allow applications to take advantage of the present technology, several examples will be discussed in greater detail below.

For example, an email client may be modified in such a way that an address book for the email client is maintained in a trusted computing environment. The legacy computing environment may be utilized to maintain general email forms and otherwise generate the content of the email such as the body or attachments. The trusted computing environment may add an email address to the email form only before the email is transmitted. Again, the composition and generation of the bulk of the email document may occur in the legacy computing environment. On the other hand, it is possible to protect the content of the email by creating it in the trusted environment and employ encryption in the trusted environment. Other examples of applications may include a calendar where content of the calendar is maintained in the trusted computing environment, and calendar forms are managed in the legacy computing environment. Additionally, location or positioning data for the computing device, obtained from a Global Positioning System (GPS) module or another positioning module may be managed in the trusted computing environment, whereas maps or other forms are managed within the legacy computing environment and then combined by overlaying the trusted environment data or video over the video provided by the legacy environment, shielding the sensitive data from the legacy environment access.

The exchange of data and files (such as images or graphics), between two or more applications may be securely accomplished by allowing the trusted environment to operate as an interface between the two applications (e.g., a picture from any application may be inserted in a power point presentation) without direct communication between the two applications. In sum, the trusted computing environment acts as a proxy between the two applications.

When the data is displayed, printed, or faxed, the trusted environment can add the relevant information while the computing intensive operations of preparing the bulk of the document are executed within the legacy computing environment.

As mentioned above, the present technology can be applied to server farms, the corporate server environment, and cloud computing environments. By accessing the cloud with the trusted environment, the security of the cloud environment is increased greatly. It is noteworthy that in many cases, central systems are infiltrated from an end user computing device that is directly coupled with the cloud or through a network, such as the Internet.

These and other advantages of the present technology can be described in greater detail below with reference to the collective drawings.

FIG. 1 is a schematic diagram of an exemplary computing device 100, constructed in accordance with the present technology. Generally, the computing device 100 includes a trusted environment 105 having a trusted processor 110 and a trusted memory 115 for storing executable instructions. The trusted processor 110 executes the instructions stored in trusted memory 115 to provide a trusted computing environment 120 that performs computing functions that could expose the computing device 100 to a security risk. Exemplary computing functions that could expose the computing device to a security risk includes any of the aforementioned processes, and generally any operation or process that utilizes sensitive information. The trusted computing environment 120 also stores sensitive information for the user in a manner that shields the sensitive information from a legacy environment 125.

The legacy environment 125 includes a secondary/legacy processor 130 that is physically separated from the trusted processor 110. The legacy environment 125 also includes a legacy/secondary memory 135 for storing executable instructions. The secondary/legacy processor 130 executes the instructions to provide a legacy computing environment 130A that manages computing functions of the computing device 100 that are exposed to unsecure environments, such as a network or device that may be utilized to expose the computing device 100 to malware or other similar malicious applications. In some instances, the legacy memory 135 may include safe legacy applications 140.

While discussed in greater detail below, the trusted memory 115 may store a content insertion module 145, a firewall application 150, and a sensitive information module 155, as well as other modules that are executed by the trusted processor 110.

Generally, the computing device 100 includes separate components (hardware and software) that could impact the security, privacy, and/or safety of the user. All computing aspects that could impact the security, privacy, and/or safety of the user are prevented from being executed within the legacy environment 125 are incorporated into or executed within the trusted environment 105. The user interfaces with the computing device 100 through this trusted environment 105, which allows the user to conduct computing operations safely and securely, while protecting the privacy of the user as well.

While only one legacy environment 125 is illustrated, it will be understood that the computing device 100 may comprise several legacy environments, supporting various levels of computing functions/operations. A legacy environment 125 is a computing unit which may share its CPU with other legacy environments. In other embodiments, each legacy environment may have a dedicated processor. One legacy environment may allow full and free use of network resources, such as Internet access, with downloads and execution of applications allowed. Another legacy environment might allow the use of only safe legacy applications 140, such as applications that come from trusted application providers or applications that are approved by the user. Another legacy environment might be dedicated for games or other specialized computing applications.

It will be understood that the hardware and software components of the trusted environment 105 may differ to accommodate various design requirements. By way of non-limiting example, in order to reduce cost a designer can use a lower cost CPU in the trusted environment 105 and as result some computing intensive functions as video chat that requires video and voice processing, compression/expansion, and encryption/decryption, may not be supported. In these instances the trusted environment 105 can transfer captured video and voice to a legacy environment 125 to carry out the above functions, where the legacy environment 125 incorporates a more powerful CPU.

The trusted environment 105 is connected to all I/O devices 160 and incorporates any software or application that could impact the security or privacy of the user. In other embodiments, the trusted environment 105 may be connected to a portion of the I/O devices 160 using trusted I/O interfaces 160A. The devices connected to the trusted environment 105 may include, for example, devices that receive, display, or otherwise process sensitive information. Similarly, the legacy environment 125 may be connected to a portion of the I/O devices 160 using legacy I/O interfaces 160B. The devices connected to the legacy environment 125 may include, for example, devices that receive, display, or otherwise process non-secure or non-sensitive information. Again, the legacy environment 125 includes a legacy second processor 130, an operating system (OS) 165, and safe legacy applications 140. The safe legacy applications 140 may include not only applications such as web browsers, word processing, email, and other similar applications, as well as one or more additional OSs and/or virtual machines. In general, the legacy environment 125 is similar to a conventional computing system architecture, such as the computing system 1 of FIG. 6.

In one embodiment, the trusted memory 115 and the legacy memory 135 may reside in a single memory device that has been separated into trusted and legacy portions. In other embodiments, the device may include only a single trusted memory that can be utilized by both the trusted processor and the legacy processor.

In some embodiments, the trusted environment 105 and legacy environment 125 may cooperate through gated channels 170 that allow the trusted environment 105 (and specifically an OS 175 of the trusted environment 105) control what data is transferred to and from the legacy environment 125. Specifically, the data transferred between the trusted and legacy environments are preferably controlled by the user, through one or more Central Processing Unit/Operating System (CPU/OS) driver components 180.

In operation, a user interfaces with the computing device 100 via input and output devices, such as I/O devices 160. Various computing modules can be connected directly to the computing device 100 such as a GPS (Global Positioning System) module.

Input devices are devices that are receiving information from the user. This information may impact their privacy or security. For example, a keyboard provides input that is indicative of critical/sensitive information, such as user identifiers, passwords, account numbers, proprietary information, emails, and so forth. Such information may be stored within the trusted environment and made inaccessible to the legacy environment. Other exemplary input devices include, but are not limited to a mouse, a trackpad, motion-based input systems, a tablet, a touchscreen, a camera, a microphone, biometric devices (e.g., iris, finger print, voice recognition, face recognition, etc.), a scanners, a GPS device, and a joystick—just to name a few. Output devices are presenting to the user information that might impact privacy or security. Exemplary output devices include, but are not limited to displays where sensitive content could be transferred to a remote operator (e.g., hacker). The output device could expose sensitive information to the hacker or allow the hacker to take immediate action. Exemplary actions could include the re-transmission of a human test (e.g., Completely Automated Public Turing test to tell Computers and Humans Apart (CAPTCHA)) to create an email account.

Another vulnerable output device(s) may include speakers. For example, classified discussions may be captured and retransmitted to a hacker if executed in a legacy environment. Again, these output devices are also shielded from the legacy environment.

As mentioned, particular computing system or application designs might differ in the way data flows in the computing device 100, so the camera output, though protected, could be transferred as raw data directly to the legacy environment 125 for processing. Some designs might allow direct connection of the camera to the legacy environment 125. In some other designs a game joystick might be connected only to the legacy environment 125.

Trusted memory 115 is also separated from the legacy environment 125, allowing for control of what data is accessed by the legacy environment 125, whether the data is read or stored. The network interface 185 provides an interface with a network or other computing devices or hardware that is external to the computing device 100. Thus, all data transfers are controlled by the user through the trusted environment 105.

Sensitive information in the trusted environment 105 is protected from exposure to malware in the legacy environment 125. Information maintained and used by the trusted environment 105 may include, but is not limited to: firewall settings; directories; email lists; user IDs and passwords; account numbers; favorites; encryption codes; credit card numbers; and social security numbers, as well as other types of sensitive information that would be known to one of ordinary skill in the art with the present disclosure before them.

Figure 2:
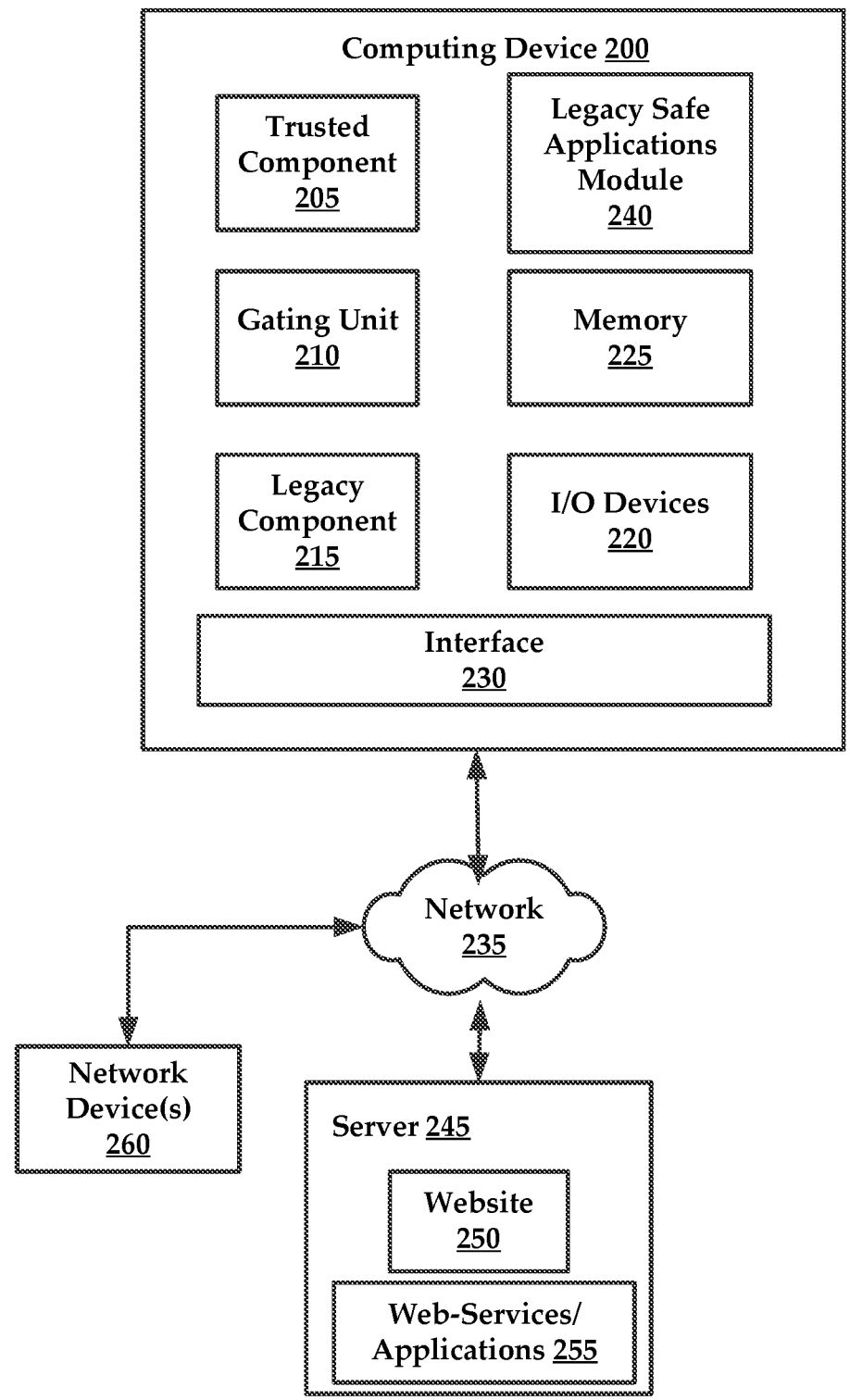
FIG. 2 is an exemplary network arrangement including a computing device, such as the computing device of FIG. 1, in communication with a server and one or more network devices.

FIG. 2 is an exemplary additional embodiment of the present technology. The computing device 200 (also referenced as computing system 200 and system 200) includes a trusted component 205 having the components of a trusted environment 105 of FIG. 1, as described above, as well as a gating unit 210 to interface with a legacy component 215. The user operates the computing device 200 through the I/O devices 220. A memory 225 is used to store data and programs utilized by the trusted and legacy components. An interface 230 is used for accessing other computing systems, communications, and network 235. The interface 230 is controlled and monitored by the trusted component 205. Again, the interface may include a plurality of varying types of interfaces that are required for the system 200 to couple with the various external devices, systems, and networks, such as external device 260.

A legacy safe applications module 240 is used to execute safe applications that are considered as coming from trusted sources and may be relatively securely upgraded and updated even via the network 235. The legacy component 215 is used for all other operations such as Internet access, downloading data and programs, as well as executing and running those programs.

Protected communications are carried out by the trusted component 205. Such communications may include, but are not limited to, bank account management, accessing medical records, handling patents or business negotiations, and the like. The trusted component 205 may determine if a communication potentially includes protected communications, where these protected communications include or may expose sensitive information.

Software or application utilized by the system 200 can be modified to take advantage of the dual environment nature of the system 200. For example, the system 200 can support existing software by means of the legacy component 215.

According to some embodiments, the management and execution of an application may be divided between the trusted and legacy components. For example, applications can be designed such that there is a trusted module that executes in the trusted component and a legacy module that executes in the legacy component. Alternatively, programs can be written to only run on a trusted environment of a trusted component 205. These applications can leverage the secure communication that the trusted environment provides. In some embodiments, requests for acknowledgement (Ack) or authentication can be made through the trusted environment and may be displayed for the user directly to a display device, such as a monitor or a web browser client without the involvement of the legacy environments. This means that the display device may have a unique structure to support this capability, as described above.

The system 200 may communicate with a server 245 that facilitates a website 250 that provides web services. The computing system 200 communicates with the website 250 via the network 235. Web services or applications 255 that are executed on the website 250 may be modified to maximize security of the website 250. The system 200 can be utilized to facilitate the secure transfer of funds from account. By way of example, the website 250 includes a bank site that may be accessed from a legacy component 215 of the system 200. The request for fund transfer can be made directly to the website 250 from the trusted component 205. The website 250 transmits to the system 200 a request for a user Identifier Document (ID) and password can be displayed directly to the user, by the trusted component 205 without use of the legacy component 215. Remaining portions of communications between the system 200 and the website 250 can be made directly by means of the trusted component 205. Therefore, the legacy component 215 cannot access sensitive data such as account balance, account number, amount transferred, transaction addresses (e.g., routing or bank number), and so forth. Non-sensitive site information can be presented through the legacy component 215 such as promotional videos, general bank information, and the like, so the computing processes required of the trusted component 205 are reduced.

In some embodiments, the present technology may be configured to execute modules/functionalities of an application in the trusted environment and one or more legacy environments. For example, a computing program may include three or more separate modules that can be executed in sequence or in parallel with one another. A first module of the application may be executed in the trusted environment, while a second module (e.g., routine or process) can be executed in a legacy environment. Finally a third module can be executed in a second legacy environment. As with other embodiments, the trusted environment may execute a first module of the application that utilizes or implicates the use of sensitive information, while a legacy environment execute a second module of the application. Also, a third module is executed by a second legacy environment. It will be understood that both legacy environments process data that is not secure. Often the legacy environments will execute modules of the application that are computing resource intensive, where these modules do not process or utilize sensitive information.

Advantageously, the present technology may be used with all secured communication methodologies, where legacy components are prevented from accessing, in any way, sensitive information. In some cases, modifications to the server 245 or website 250 may be facilitated. In an alternate embodiment, acknowledgement requests might be displayed using the legacy component 215 but not the responses thereto.

In some embodiments all communication may be channeled through the trusted component 205. Thus, access to a network 235 via a central site may be forced, increasing the security of the system and providing an opportunity to integrate information related to multiple users, such as malware threats, site grading, risk analysis, hacker avoidance, detection, and tracking.

Figure 3:
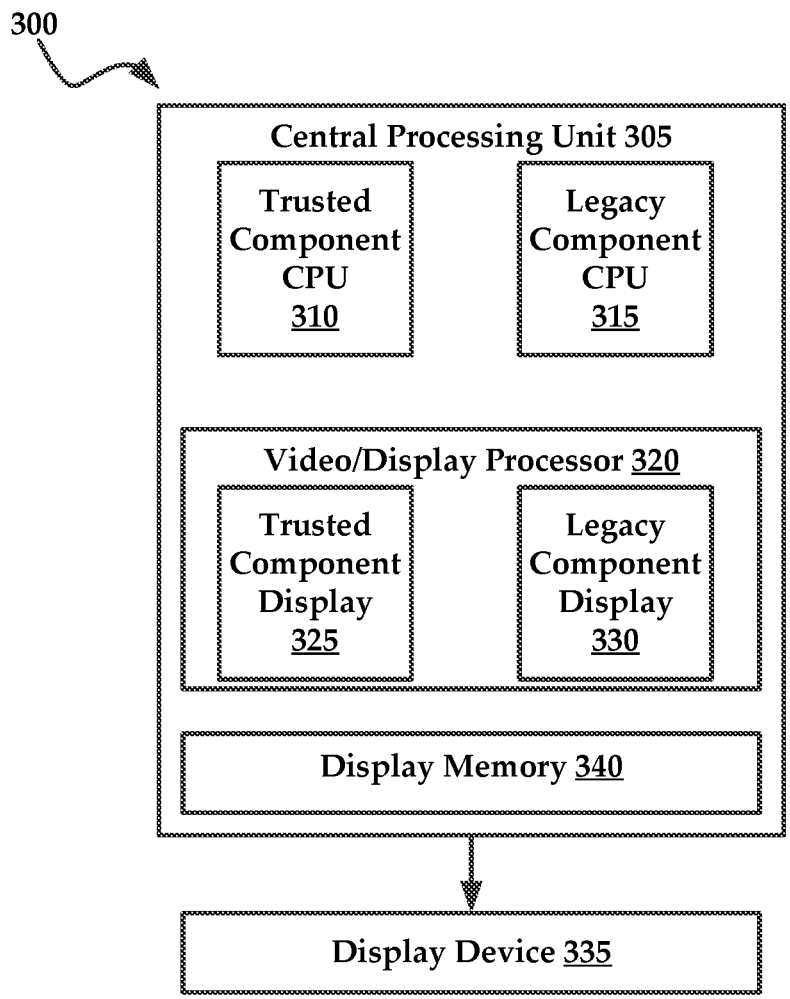
FIG. 3 is another exemplary implementation of a computing device, such as a Central Processing Unit (CPU) portion having both a trusted portion and a legacy CPU portion, the device being constructed in accordance with the present disclosure.

FIG. 3 is a schematic diagram of a device level implementation of the present technology on device 300. This implementation can reduce the cost of a system that integrates the device. The CPU 305 of the device 300 may contain the processing portions of both trusted component 310 and legacy component 315, both being constructed as described above. The communication between the trusted component 310 and legacy component 315 allows full control of the trusted component 310 over the legacy component 315, by virtue of hardware design. For further shielding of user information from malware, sensitive information displayed or otherwise output to the user can occur directly, without allowing access of the legacy component 315 of the CPU 305 to the displayed sensitive information.

A display processor 320 has a trusted 325 and a legacy 330 components, which are connected directly to a display device 335 by means of a display memory 340.

As mentioned above, handling of malware within the legacy environment by the trusted environment is possible. The architecture inherently provides the following protection features: (a) system memory is protected from malware access; (b) user actions and data entered are shielded from the malware; (c) malware may not modify the firewall; (d) malware cannot access the email lists; and (e) malware is prevented from accessing the network, such as the Internet. In some embodiments, encryption techniques may be executed entirely within the trusted environment.

Additional features may be added such as comparing malware actions to user inputs, which allow for the detection malware in the legacy environment. For example, a system of the present technology may simulate keyboard actions executed by malware while the user is not keying or input different keys. Such knowledge may indicate malware presence. A system of the present technology may also monitor attempts to access certain memory areas by a legacy environment. These attempts to access memory could indicate malware presence. Attempts to access the Internet or another network with certain content or at certain locations (e.g., Uniform Resource Locators (URLs)) could indicate malware presence. For example, the system may detect an attempt to transfer a human test (e.g., CAPTCHA) to a remote site.

In some embodiments transfers of pseudo-information by an exemplary system can be allowed as part of means to defeat malware actions and identify activity of that malware on a network. Monitoring programs running on a legacy system allows a trusted environment to mark specific malware programs. Handling of malware by a central site can further enhance the protections of users. For example, communication with individual end user computing devices may include obtaining URLs (both accessed and attempted) of the end user system, and correlating specific information that was in the end user system with pseudo-information used by malware such as account numbers, passwords, URLs, IP, medical data, and credit cards.

The present technology may also facilitate the exposure of malware and provide potential remediation opportunities. For example, if a malware application in a legacy environment attempts to download data from "infected" systems, these malware applications can be seeded with data that can be marked, allowing for identification of the malware. Also, the trusted environment can seed infected data that is transmitted to the malware to infect and attack the malware control system.

The following include some non-limiting implementations for the present technology. For example, smart sensors may be designed with the split trusted/legacy component architectures provided herein. To allow remote upgrades and networking of the smart sensors, the trusted environment of the smart sensor can provide certain raw data to a central system that can be processed and compared to the data processed by the legacy environment of the smart sensor. The raw data provided by the trusted environment of the sensor can be transmitted to the central system at a lower rate transfer rate. The software design for the sensors can take into consideration typical malware exposures of a smart sensor and potential infections, potential risks, and the options for detecting an infection. These processes may be facilitated by lower rate processing of raw data received from the trusted environment.

Another example involves a router that is constructed in accordance with the present technology. The use of a trusted environment in a router allows for the detection of modifications in the router legacy environment, such router settings. Again, the detection is made by comparing trusted data to suspected malware contaminated data.

Figure 4:
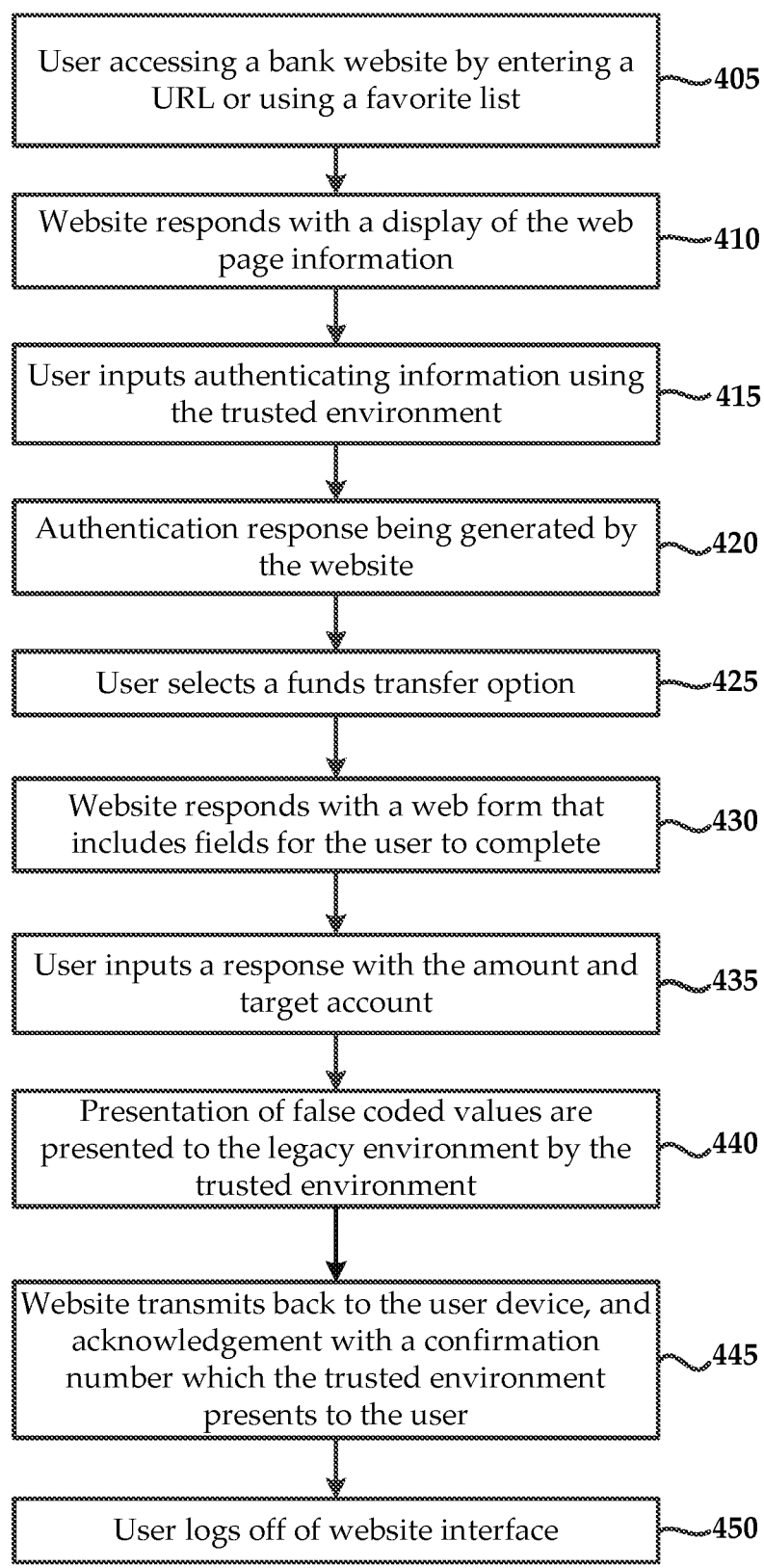
FIG. 4 is a flowchart of an exemplary process of conducting a financial transaction using the network arrangement of FIG. 3.

FIG. 4 is a flowchart of an exemplary use case including process of transferring of funds between accounts. The flowchart describes separation of operations between trusted and legacy environments to achieve privacy protection goals while allowing the legacy environment to handle the heavy (e.g., computing intensive) processes and trusted environment to protect the security, privacy, and safety of the user.

The process starts with the user accessing 405 a bank website by entering a URL or using a favorite list (which resides in the trusted environment). Again, this information is blocked by the trusted environment from the legacy environment. A firewall that resides in the trusted environment allows the user device to access the URL on the network, via the network interface that is dedicated to the trusted environment. It will be understood that the firewall is fully monitored by the trusted environment and the legacy environment is prevented from access the firewall. The website responds 410 with a display of the web page information with the feature rich capabilities via the trusted environment, bolstered by the powerful processor of the legacy environment. These pages include a login page where the user inputs their authentication information.

The user inputs 415 authenticating information using the trusted environment using, for example, a keyboard. It is noteworthy that the end user interacts with the computing system as with a typical computing system. That is, the computing system, while including both a trusted and legacy component, appears to function to the end user as a typical computing system. The dual operations of the trusted and legacy environments are conducted transparently to the end user.

Again, authentication information is not presented to the legacy environment as it includes sensitive information. In some embodiments, if the trusted environment determines that the login page is operated by malware or an untrusted system (such as with a phishing attempt), the trusted environment may present the user with an option to fight malware, which includes allowing the legacy environment to provide the phishing website with a false account number and password.

If malware may attempt to access the account without the user knowledge or consent, or transfer the information to a remote hacker (and potentially coded false information) can be used to identify the source and the time of such "breach" of security and the presence of malware in the computer.

The process also includes an authentication response 420 being generated by the website. Previously, the website received the user's authentication credentials from the IP address identified with the trusted environment and authenticated the user. The account balance is displayed to the user via the trusted environment.

Once authenticated, the user selects 425 a funds transfer option. The website responds 430 with a web form that includes fields for the user to complete such as amount and target account for funds transfer.

The user inputs a response 435 with the amount and target account. Optionally, false coded values may be presented to the legacy environment by the trusted environment in step 440. The website transmits back to the user device, and acknowledgement 445 with a confirmation number which the trusted environment presents to the user. Also, a coded value may be presented to the legacy environment, allowing tracing of malware activities and remote hacker involvement. The user may logout in step 450.

Again, portions of the website may be generated for display by both the trusted and legacy environment. These outputs are combined together in the legacy environment to create a cohesive display for the user. The website is programed to operate effectively with the present technology, leveraging the advantages of the dual nature (trusted/legacy) of the user devices.

The website can cooperate with the user devices by false coding information provided by the user devices. This false coding allows the website to identify the sources of hacking attempts by matching the false information with IPs that communicate malware. Attempts that are made from the user system may be identified by the user system and allow for a transparent transfer of data to the website, where the legacy environment IP identifies the source. Since the information that is accumulated by the site is false (e.g., spoofed) and coded, attempts to use it by the malware or a remote hacker can expose such attempts and the source, such as the IP address or MAC address of the malware system.

Other exemplary implementations of the present technology will be described. For example, the present technology may be implemented as part of programmable sensors such as within a smart grid, nuclear reactors, home automation, fire alarm, sensors network, and so forth. Authentication can be effectuated by creating an additional source of data that is transmitted directly from the trusted environment to a central system and evaluated by comparison with complementary processed data received from the legacy environment. Contamination of the legacy environment can be indicated by discrepancies between the expected values from processing the direct channel information from the trusted environment and the output of the legacy environments of the remote sensor.

The present technology may be adopted to protect existing computing systems. For example, an external unit or trusted computing component may be added to an existing legacy computing device through which a network, such as the Internet, can be accessed. All or some of the input devices (or output devices), can be connected to this external unit. The external unit may be a physical box or a card in the computing device. At a minimum, the keyboard is connected to this external unit. Based on the specific implementation, the existing computing system might require driver changes.

This trusted computing component can encompass the components and behaviors of a trusted environment. In some embodiments, a trusted computing component can be added an external unit to which all or some of I/O devices are connected. In other instances a router may be used as a trusted environment to which I/O devices are connected. In some embodiments, the trusted environment may be incorporated into an I/O device such as a keyboard, which is configured to couple with other devices.

In some embodiments, the trusted computing component may include a card for a motherboard to which I/O devices are connected. Also, the trusted computing component may include a unit that is added between a keyboard and a PC, such as a USB interface, to which an Ethernet connection may be added. This trusted computing component may be added in parallel or serial with the PC.

Other exemplary uses for the present technology include human tests, such as CAPTCHA, which can be handled in a trusted environment.

The present technology supports the use of BYOD (Bring Your Own Device) technologies since the present technology reduces greatly the ability of an end user to contaminate a network. Also, mobile payment systems can be improved by use of the present technology enabling the exchange of transaction codes between the financial institution and the trusted environment of the "mobile" computing system (e.g., smartphone, pad, notebook, PC, etc.), rather than the use of credit cards. In some embodiments, transactions are made by use of these codes only, where each user has a number of codes. The codes expire when used and/or according to a set time frame. The codes are updated by direct communication between a trusted environment of a computing system and the financial institution.

The secured communication provided by the present technology allows for greater flexibility and feature rich applications that may be downloaded from the Internet or communicated between participants in the game. Current multiuser games are very vulnerable to disastrous contamination of computing systems by malware. The use of trusted environment for sensitive information and legacy game oriented environments enables secure communication and downloads of information between users, store sites, and service sites. By way of non-limiting example, the present technology may allow for use of secured GPS services (connected and transferred through the trusted environment) which allow transfer of data on conditions of anonymity and perimeter protection. This protected GPS data may not be hacked and as result a user perimeter control may be implemented to avoid undesirable user address exposure. The database for game participants may be comprised of game codes that are a means of communication between a trusted environment and the game site, where all user information is maintained in the trusted environment of the user computing device and not on the game server side.

The present technology may also provide users with secure access to social networks. For example, the present technology may be utilized to effectuate a secure upload of information into user pages can provide a safe authentication features. Communicating may also be facilitated through a trusted environment. The user could separate the information they are willing to share into portions that can be carried on a separate portable removable storage. This private information may be integrated with a cloud presence in a seamless nature while maintaining an increased level of privacy and safety.

Figure 5:
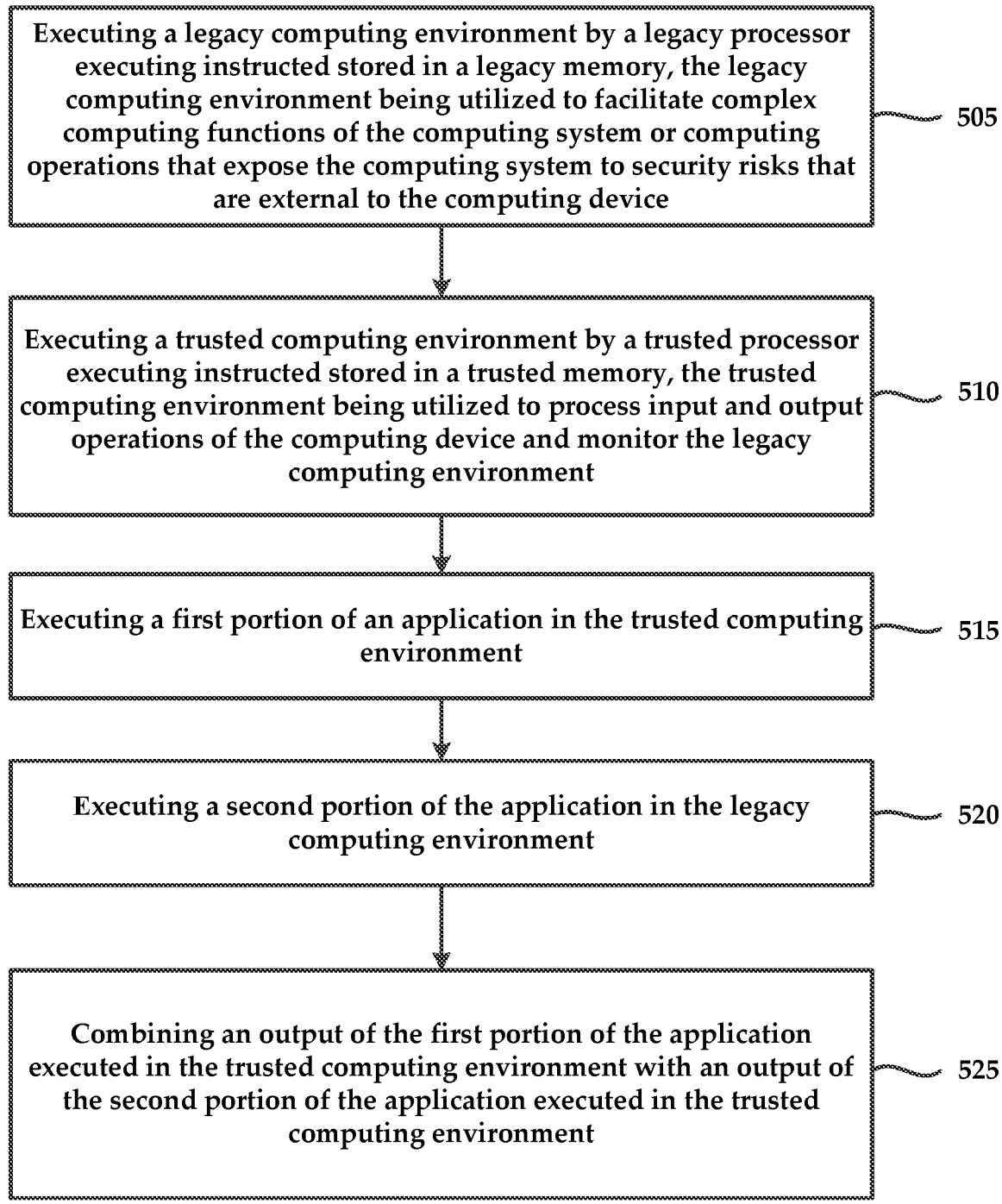
FIG. 5 is a flowchart of an exemplary method for providing secure computing operations on a computing device, the computing device being constructed in accordance with the present disclosure.

FIG. 5 is a flowchart of a method for providing secure computing operations on a computing device. As mentioned above, the computing device includes the dual trusted and legacy architecture described above. In some embodiments, the method includes executing 505 a legacy computing environment by a legacy processor executing instructions stored in a legacy memory. It is noteworthy that the legacy computing environment is utilized to facilitate complex computing functions of the computing system or computing operations that expose the computing system to security risks that are external to the computing device.

In some instances the method includes executing 510 a trusted computing environment by a trusted processor executing instructions stored in a trusted memory. As mentioned above, the trusted computing environment is utilized to process input and output operations of the computing device and monitor the legacy computing environment.

In some embodiments, the method includes executing 515 a first portion of an application in the trusted computing environment; and executing 520 a second portion of the application in the legacy computing environment.

According to some embodiments, the method includes combining 525 an output of the first portion of the application executed in the trusted computing environment with an output of the second portion of the application executed in the trusted computing environment.

Figure 6:
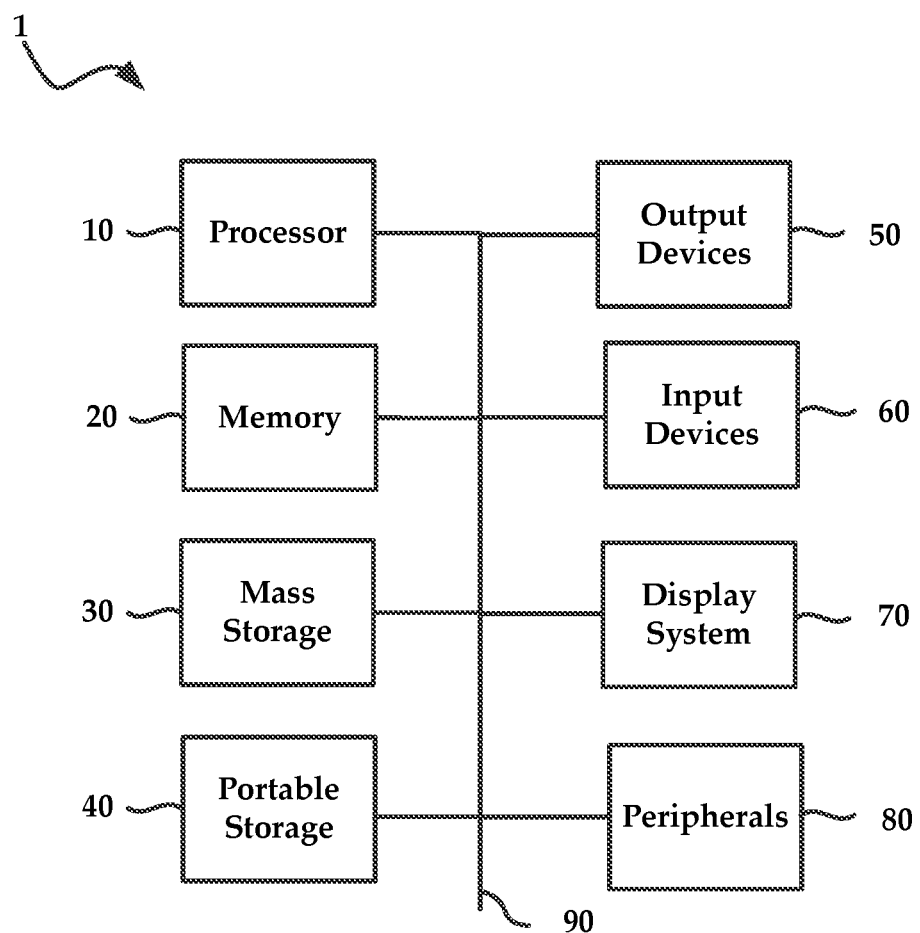
FIG. 6 illustrates an exemplary legacy computing system that may be used in conjunction with a trusted computing environment of the present technology.

FIG. 6 illustrates an exemplary computing device 1 (also referenced as computing system 1) that may be used to implement an embodiment of the present systems and methods. The computing system 1 of FIG. 6 may be implemented in the contexts of the likes of computing devices, radios, terminals, networks, servers, or combinations thereof. The computing device 1 of FIG. 6 includes a processor 10 and main memory 20. Main memory 20 stores, in part, instructions and data for execution by processor 10. Main memory 20 may store the executable code when in operation. The computing system 1 of FIG. 6 further includes a mass storage device 30, portable storage device 40, output devices 50, user input devices 60, a display system 70, and peripherals 80.

The components shown in FIG. 6 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 6. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the computing system 1 as shown in FIG. 6 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 6 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Embodiments described below relate to security challenges posed by mobile devices that are connected to networks, such as corporate networks, a trend termed B.Y.O.D. (Bring Your Own Device).

Some of these embodiments provide systems/devices and methods that prevent mobile devices, such as may be found in corporate networks, from damaging the corporate network and its members through the use of malicious attacks.

The present technology protects the network from the mobile devices and any attacks that the mobile devices may attempt to launch against the network. The present technology includes protection by software installed on the mobile device or by adding hardware to existing parts of the network (including the mobile devices). Example hardware comprise an external unit to the computing system, such as a dongle, a card that is added to a computing system by plugging into a socket or other interface of the computing system, or by firmware added to a circuit of the computing system.

The trend that allows users to use their own Smartphones or PADs to integrate into corporate networks presents a challenge to securing these networks. The challenge results from the potential contamination of such devices by malicious software (malware) that is designed to access and get hold of corporate secrets. Since such devices are at the disposal of the user for personal communication, the probability is higher that such contamination may occur. Still there is the desire to allow the user to communicate with the corporate network with such devices, since it is convenient and may improve users' productivity. Additionally, corporations can benefit from not having to purchase end user devices for their employees.

The systems, devices, and methods of the present technology are an enhancement to secure communications of such devices with the network. The goal of the present technology is to protect the network from the users' devices and possible malware or malicious attacks.

Authentication of users and prevention of malware from mobile devices accessing and operating in the networked environment can create complications from a security perspective. Advantageously, the present technology achieves solves these issues by authenticating requests posed to the network, by employing a central "clearing" means on the network through which the mobile devices are accessing the network. These clearing means are referred to as trusted environment devices (also referred to as a module, system, card, and the like).

It can be assumed that malware programs attempt to communicate with the network in order to obtain access to network resources or nodes, or to take action that is contrary to (or in excess of) the permission level assigned to the user or the means of communication.

In some embodiments, authentication can be accomplished by using software to specifically program a computing system that is attempting to access the network. For example, human tests that use image, video, text, verbal message, CAPTCHA can be used, as well as biometric input such as camera, finger print, voice recognition, and iris scan—just to name a few.

These authentication types can be implemented by communicating over the corporate network or over an alternative network such as a cellular network, or through a Wi-Fi access point.

These techniques are vulnerable to being contaminated by malware, presenting three example risks: (1) masquerading as authenticated user/process; (2) defeating authentication; and (3) participating in network Distributed Denial of Service (DDoS), as well as other techniques that would be known to one of ordinary skill in the art By adding external trusted environment devices of the present technology that can be implemented on various levels of integration into the mobile device or/and its peripherals, the protection of the network may be enhanced since the authentication is improved greatly, even in presence of malware.

Some embodiments contemplate authentication by an external unit (such as a dongle). The dongle will serve as the communication means of the mobile device to the "clearing" center of the network. In some embodiments, the clearing center could include the corporate server that is provided also with a trusted environment device or module.

The dongle will serve as a trusted environment device for the mobile device. The dongle will include an authentication module that uses at least user action (such as a button) that is shielded from the mobile device and could not be imitated or emulated by the mobile device.

The dongle may include more than one key or button, a display, one or more colored LEDs, a microphone, a speaker, a camera, and so forth. The user can communicate directly with the network in such a way that the network is totally shielded from the potentially contaminated mobile device. Such trusted environment devices may be added also to notebooks or even desktop PCs or servers on the network. Various examples will be provided below in greater detail.

Networked additions to smartphones may be integrated by means of appliances, modified IT administrator station, and servers. Software written for such networks will implement monitoring software that will detect anomalies or unauthorized requests before damage is caused. Such monitoring will allow for protection of the corporate network but users will benefit as well since malware will be detected early in its deployment and will not be able to operate without user consent.

In some embodiments, the implementation will use the voice channel of the mobile device to communicate to the user and/or Short Message Service (SMS), creating multiple factor authentication functions. Some processes that can benefit from this approach include, but are not limited to modifying a password, altering a firewall list, gaining access to secured information, and so forth.

Employing such techniques may also defeat insiders by combining biometric and presorted references and actual videos or voice messaging. Having the security department of the corporation providing these features to users will allow for providing even better security, for example, the creation of presorted image and/or video files or voice signatures stored in the dongle.

In another embodiment, an external card for a computing system can function as a trusted environment device. This external card is installed in a socket connected to the motherboard. In some embodiments, at least the keyboard and network (Internet) access functions of the computing system are carried by the external card that serves as the trusted environment.

As more I/O devices are connected to the external card the secured operations are improved such as, display, camera, microphones, speakers, biometric devices, and others. Software to protect data and applications of the computing system are also protected such as passwords, encryption code and application, firewall, and so forth.

The external card communicates to the legacy parts of the computing system by means of existing I/O interfaces, with no need of modifications to APIs in the legacy portions. By way of example, a legacy USB port that is used for keyboard input may be used with the card to transfer keyboard strokes to the legacy system.

In another example APIs servicing these I/O devices can be modified in the legacy environment to use a card interface such as the PCI or PCIe for communicating keyboard strokes.

In other embodiments, the trusted environment device/module can comprise firmware/microprocessor-system, which is added to a legacy-computing component for enhanced security. All I/O will be preferably controlled by the additional hardware (e.g., the trusted environment device) and particularly the network connections and the keyboard connection.

Another extreme case may be the use of two computers, one serving as a trusted environment, taking care of all I/O functions, and the other as a legacy system. This is clearly overkill, but in some cases a designer might prefer this structure.

Peripherals may be modified to create trusted environment operating with the legacy environment, to enhance and secure the whole system to which the peripheral is connected. Example of such peripherals may be keyboards or home routers.

Software supports these trusted environment devices and allows for secured applications to run. The legacy environment runs seamlessly on the legacy component (e.g., off the shelf computing system or legacy components of that system) while the trusted environment device monitors the legacy operations.

In sum, the present technology adds components (e.g., trusted environment devices) and programs that enhance security of computing systems, such as, PCs, PADs, smartphones, servers and so forth.

The additions allow for the detection of unwanted software (malware) that accidently or on purpose, was installed in the legacy system. The add-on is a trusted environment device or module that cannot be infected by downloaded software. It allows for safe authentication of user actions and allow for the implementation of effective network protection processes.

In some embodiments, the present technology includes hardware (in some instances firmware) and software. A device is formed that serves as a trusted environment, which is added to a legacy system/environment. The device allows for user authentication by the trusted environment that is configured to provide such features through instruction stored in memory and executed by a processor. In some cases the interface to the legacy system/environment is modified to allow the trusted environment to fulfill its tasks.

The added trusted environment may be implemented to provide protection to user critical data (such as passwords, encryption codes, email lists . . . ) or applications (such as firewall, encryption, email, SMS . . . ). The functionality of the trusted environment depends on the integration level with the legacy system/environment.

In some embodiments, a module of the present technology can be added externally to the legacy system (such as a dongle for a smartphone). This module can be limited with one or more security functionalities when compared other embodiments such as an add-on card to a computing system, since the integration with the computing system is more involved than with the external dongle for the smartphone.

Figure 7:
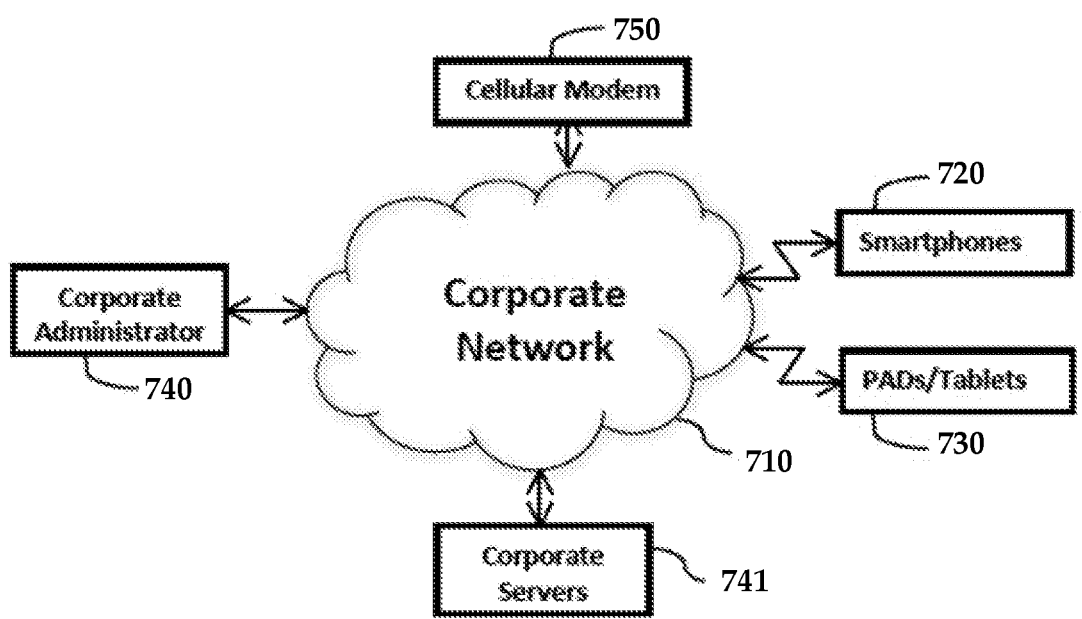
FIG. 7 is a schematic diagram of a prior art BYOD (Bring Your Own Device) system.
Figure 8:
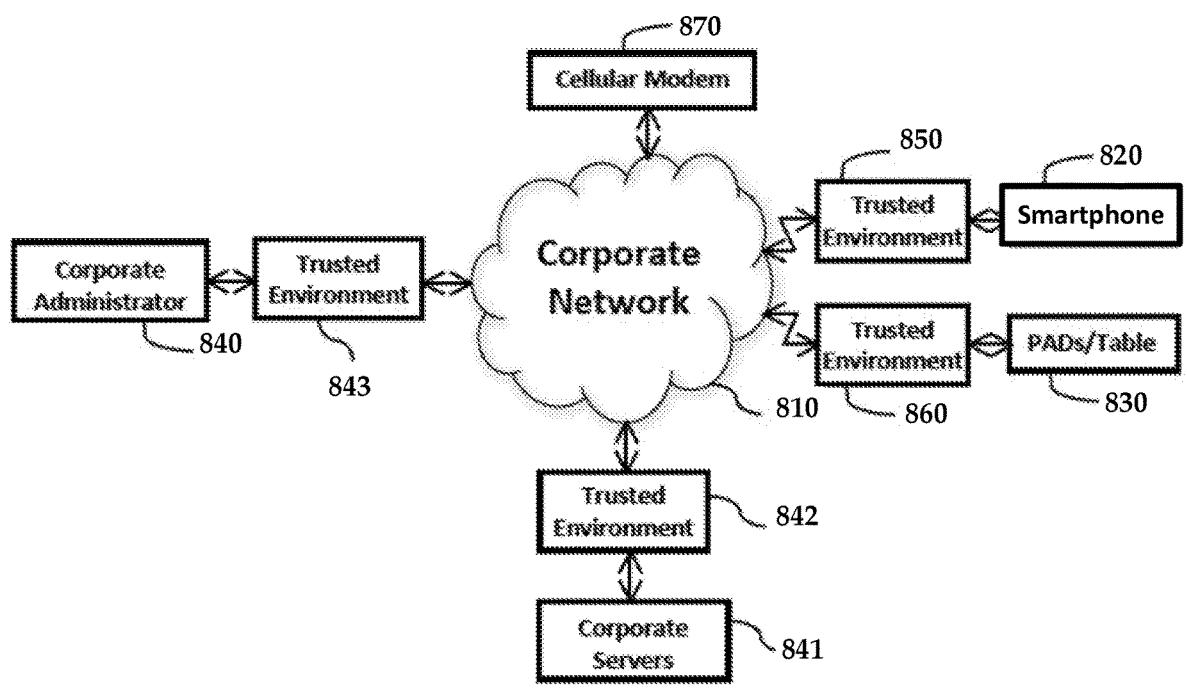
FIG. 8 is a schematic diagram of a BYOD system of the present technology that utilizes trusted environment devices/modules.

For purposes of context in describing the embodiment of FIG. 8, a prior art network is illustrated in FIG. 7. More specifically, FIG. 7 depicts the basic configuration of the BYOD (Bring Your own Device) network, created when users' devices, such as smartphones, PADs, and even notebooks are used and connect to the corporate network. In general, devices that are not limited to corporate only use are potential sources of contamination.

The corporate network 710 provides communications between the corporate computing systems and serves as an interface to the external world or other networks, such as the Internet, cellular telecommunications systems, and so forth.

The corporate components will include at least the corporate administrator 740 systems(s) and the corporate server(s) 741. Other corporate systems may be connected to the corporate network 710. All of these systems are similar in structure to the corporate administrator 740 or corporate server 741.

The interface to external world and other networks is represented by the cellular modem 750. Note that all communications described hereinafter with regard to the cellular interface are applicable to other networks to which the corporate network is connected.

The smartphone 720 and the Pads/Tablet 730 represent BYOD user devices that pose a greater risk to the corporate network 710 by introducing malware or conducting a malicious attack.

The following are various software related methods that provide solutions to secure the system. Some methods are based on multifactor authentication where authentication features are included as add-on applications that will run on the BYOD user devices, 720 and 730, and will be monitored and controlled by the corporate administrator 740. In another example the authentication of users and requests may be used to defeat malware attempts. Examples include a human test where messages (e.g., CAPTCHA, images, video, etc.) of various types may be exchanged to authenticate the user. In another example, messages are sent by the corporate server 741 or the corporate administrator 740 to the BYOD user devices 720 and/or 730. Example messages include SMS directly over the corporate network 710 or via the cellular modem 750 (that may represent also other connections such as the Internet), voice messages via the cellular system or the Internet connection, images or video messages, or any other means—even CAPTCHA. In yet another example, the BYOD user will respond appropriately via the communication means as designed for the system.

In an additional example, biometric devices and processes may be used to authenticate the user, such as voice recognition, finger print, or facial recognition. The user data is processed and authenticated by the corporate server.

Turning now from the prior art to embodiments of the present technology, FIG. 8 illustrates a solution that enhances the security of the BYOD corporate network by adding a trusted environment device to a BYOD user device. The basic diagram of the corporate communication architecture is modified by incorporating trusted environment devices with each (or at least a portion) of the various components that communicate over the corporate network 810.

The security of a component of the corporate network 810 is enhanced even only one BYOD user device within the corporate network 810 that has been modified to include a trusted environment device. In some embodiments, all components of the corporate network implement a trusted environment device.

Figure 9:
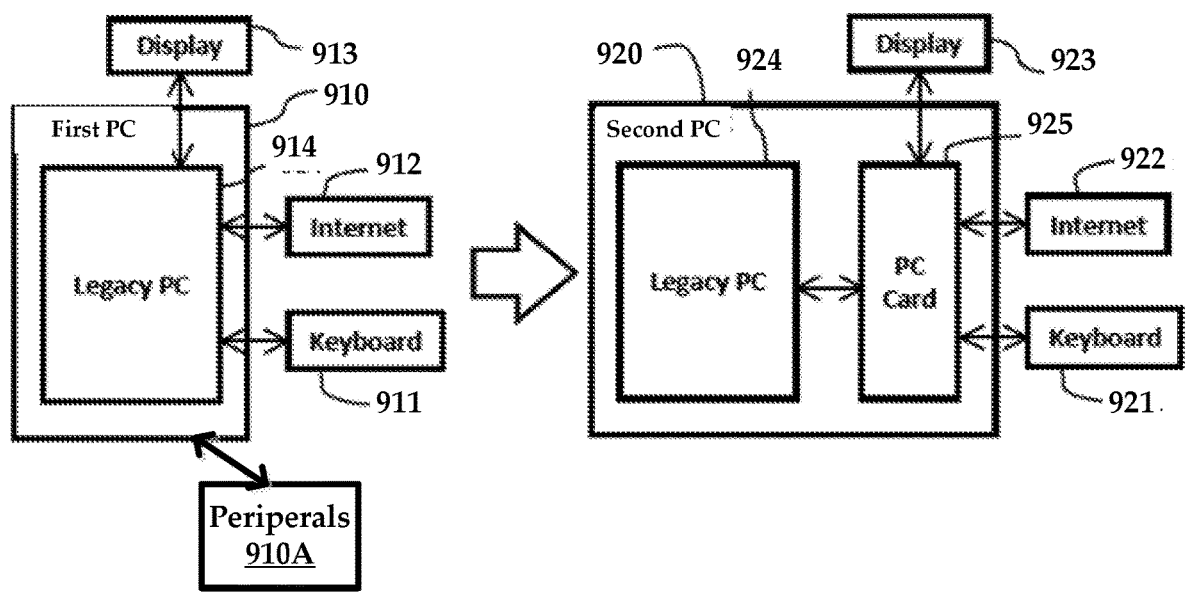
FIG. 9 is a schematic diagram of a computer system that has been modified with a trusted environment device in the form of a Peripheral Component Interconnect (PCI) add-on card.

The corporate network components such as corporate administrator 840 and corporate server 841 are integrated with trusted environment devices 843 and 842 respectively. These trusted environment devices may be designed into the corporate network components or add-on cards may be installed onto the corporate network components, as illustrated in FIG. 9. Thus, a corporate network component is defined as any computing device that facilitates or provides the corporate network 810, as opposed to the user devices that utilize the corporate network. The components of the corporate network and the BYOD user devices may alternatively be referred to as network nodes.

External trusted environment devices, such as dongles described for use with the BYOD user devices (e.g., Smartphone, tablet, Personal Digital Assistant (PDA), laptop computer, etc.), might not provide the level of security that is suggested for corporate components. Although in some embodiments, the corporate network components can use an external device.

Trusted environment devices 850 and 860 are added to the BYOD user devices such as Smartphone(s) 820 and PDAs/Tablet(s) 830, respectively. For the purpose of the discussion it is assumed that the trusted Smartphones, PDAs, and Tablets are not integrated with a trusted environment device. Further, it is assumed that the each of the BYOD user devices incorporates an external trusted environment device such as a dongle or peripheral device that includes an embedded or connected trusted environment device.

In some embodiments, the external unit allows for safe user authentication. One or more of the security functions described with respect to FIG. 7 may be utilized. The security functionality provided by the external trusted environment device to the BYOD user device further enhances the security features of the BYOD user device.

The trusted environment devices 850 and 860 each enable communication of the BYOD user devices such as Smartphone(s) 820 and PDAs/Tablet(s) 830 across the corporate network 810 allowing for such functions as monitoring and blocking the BYOD communications through the corporate network 810 to the corporate units 840 and 841. The trusted environment devices 850 and 860 also enable safe and effective user authentication methods. These authentication methods can vary with the level of security that is desired and any functionality/output requirements for the BYOD user devices such as LEDs, simple digital display, speaker, simple or complex keys, and biometric devices such as finger print readers, a microphone, and/or a camera—just to name a few.

LEDs may be used to alert the user to communications attempts by the corporate server/cloud to the BYOD user device and provide warning and alerts of malware infection without malware detection.

By incorporating a trusted environment device to facilitate communication between the BYOD user devices and the corporate network, malware on the BYOD user devices may be blocked from executing DDoS attacks on the corporate network. The infection of other systems connected to the corporate network by an automated process of the malware can also be avoided. In some embodiments, the corporate units 840 and 841 are programmed to allow for user authentication by utilizing a challenge-response sequence that may not be imitated by malware. The malware does not have access to the resources of the trusted environment devices. Moreover, the user has to physically respond to a challenge. This combination of software-type authentication and resource sequestering in the trusted environment devices is advantageous in preventing malware infection on the corporate network.

The trusted environment devices 850 and 860 are provided to the user by the corporate entity (e.g., security department). The user can then install or attach a trusted environment device to their BYOD user device. In some embodiments, the BYOD device is used when the user is attempting to access the corporate network and the trusted environment device can be removed when the BYOD user device is being used to access public networks.

According to some embodiments, the trusted environment devices 850 and 860 will communicate with both the corporate network 810 and their respective BYOD user devices.

In some embodiments, each corporation might have a unique identification number and a database in the corporate server 841 that can be utilized to record and match BYOD user device information, corporate identifiers, and users together in the authentication process.

Turning now to FIG. 9, which depicts a process where a desktop computer may be modified with a trusted environment device such as an add-on card. A first PC 910 is provided and modified to create a second PC 920 by the installation of a trusted environment device in the form of a PC card.

The first desktop PC 910 represents a typical legacy system (e.g., off the shelf device) that includes a legacy PC (e.g., CPU or processor) 914, display 913, keyboard 911, and Internet (e.g., network) interface 912. The first desktop PC 910 may include additional peripherals 910A such as a mouse, a biometric device, camera, microphone, speaker, and the like, all connected to the legacy PC 914. Examples of other I/O devices and peripherals are described also with reference to FIG. 6.

A second desktop PC 920 is provided with a PC card 925 (trusted environment device), by adding the PC card 925 the First PC 910 is made a trusted system, that is connected to peripherals that are require securing. FIG. 9 illustrates an example connection to the peripherals such as a keyboard 921, display 923, and the Internet interface 922.

The legacy PC 924 is a legacy environment that carries out all the typical functions of a computing system. The PC card 925 serves as the trusted environment. To protect data or applications the legacy PC 924 and the PC card 925 are configured to allow for the protection of data or applications of the legacy PC 924.

The PC card 925 contains or controls access to storage that maintains such lists as passwords, encryption codes, contact lists, firewall white/black lists, signatures, and biometric signatures—just to name a few.

The PC card 925 can contain those portions of applications that are required to secure those applications. Following are some examples how some applications are secured so as to clarify the use of the PC card 925 in the legacy PC 914.

Interfaces from PC card 925 to legacy PC 924 may use existing I/O, emulating peripherals in the trusted environment of the PC card 925 so that Application program interface (API) modifications are avoided in the legacy environment of the legacy PC 924 or via a card socket, such as PCI or PCIe. The API can be modified in the legacy PC 924 to allow peripherals to interface to the legacy environment of the legacy PC 924 via the trusted PC Card 925. For example, the interface from the keyboard 921 to the legacy PC 924, through the PC card 925 may be made via a USB standard interface and the keyboard emulation will be carried out in the PC card 925. In another example, the interface of the keyboard 921 is carried through the PC card 925 socket, such PCI, and an API for the legacy PC 924 modifies the communication to the keyboard.

In another example, a first computing system is utilized to connect to the I/O peripherals and serves as a trusted environment device, and a second computing system, connected to the trusted computing system (hereinafter "trusted PC"). This configuration allows a legacy environment to operate securely. The trusted PC monitors and control access to the legacy environment (e.g., second computing system) from the I/O peripherals including network communications.

With respect to encryption, a file to be encrypted is displayed directly by the PC card 925 on the display 923, where the Legacy PC 924 video is overlaid by the PC Card 925 video. Keyboard 921 strokes are displayed directly on the display 923 and information from/to the Internet 922 will also be displayed directly on the display 923. The encryption is made in trusted environment or the cloud.

Firewall security features can also be implemented. For example, lists are maintained in the trusted environment PC card 925. The list can be modified in the PC card 925 and all defenses implemented there. This may be also shared with the cloud.

Authentication security features can also be implemented. For example passwords, biometric, ID cards, and so forth. Programs are executed in the trusted environment PC card 925, when the input to the authentication program is kept in the trusted environment PC card 925, and protected from access by malware that may be present in the legacy environment, illustrated as the legacy PC 924. In some embodiments, the authentication features need to be connected to the trusted environment PC card 925.

Location features can also be implemented. For example, GPS or other location information could be protected in the trusted environment PC card 925 and the location information may be displayed by the PC card 925 directly on the display 923 while the map information is provided by the legacy PC 924.

Office and email programs and content are protected by separating the forms and templates that are used (non-sensitive data) from user inserted data (sensitive data). This is accomplished by sharing placement locations on the display, so two separated sources (or more) may be used for creating a single display 923. For example, the trusted environment PC card 925 providing sensitive information and the legacy PC 924 providing non-sensitive information.

In some embodiments, a computing system that does not provide connection of the display 923 to the trusted environment PC card 925, but still provides security with respect to passwords, encryption codes, firewall URL lists, email contacts, and the like (such as other types of data that would be advantageous to a malware attacker or program), due to the connection to the keyboard 921 and Internet 922. The trusted environment PC card 925 may lack some capabilities to secure data created by the user.

In another example, the PC card 925 may be an external unit (such as USB stick) that provides the same functionality as the embedded PC card 925 in the desktop PC 920, when the external unit is connected to the peripherals that need protection.

In another embodiment, setting of peripherals is made from the trusted environment (such as the PC card 925), preventing malware from controlling the peripherals. This is a general feature that can be applied to all implementations of the architecture.

Another feature that is general and widely applicable to the embodiments described herein is the possibility to create a single displayed screen by integrating information from different websites and channels/IPs, sourced in one or more sites. This integrated information is placed on the display 923 by various environments (trusted—Personal Computer (PC) card 925—and legacy—legacy PC 924).

Figure 10:
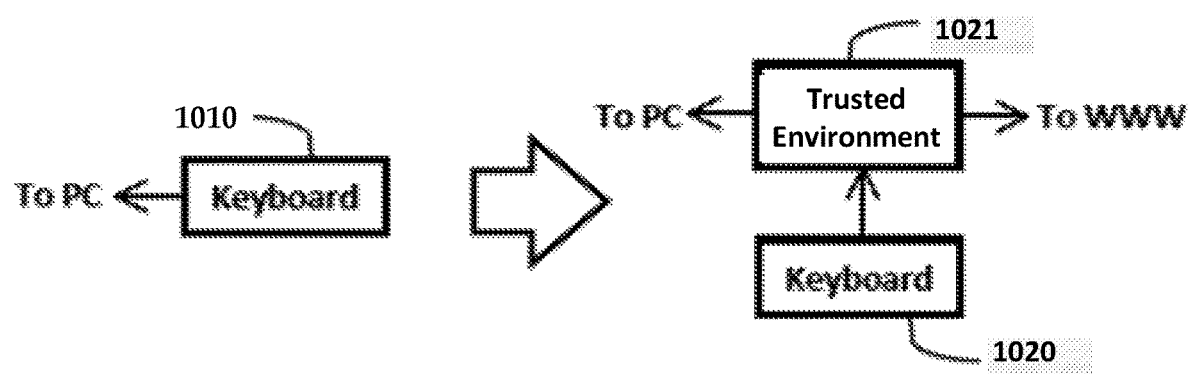
FIG. 10 is a schematic diagram of an example peripheral device, such as a keyboard, that has been modified by the addition of a trusted computing device therein.

FIG. 10 is an example of the modification of a keyboard peripheral that has been modified with a trusted environment device of the present technology. The keyboard 1010 is modified by embedding a trusted environment device 1021 therein. This trusted environment device 1021 is inserted between the PC (the legacy environment) and access to the keyboard 1020 and the Internet (or other network). In such implementations a manufacture of the modified keyboard may provide additional communication interfaces for other peripherals (as explained and illustrated with respect to FIG. 9) such as, displays, cameras, microphones, speakers, biometrics, and GPS—just to name a few.

Figure 11:
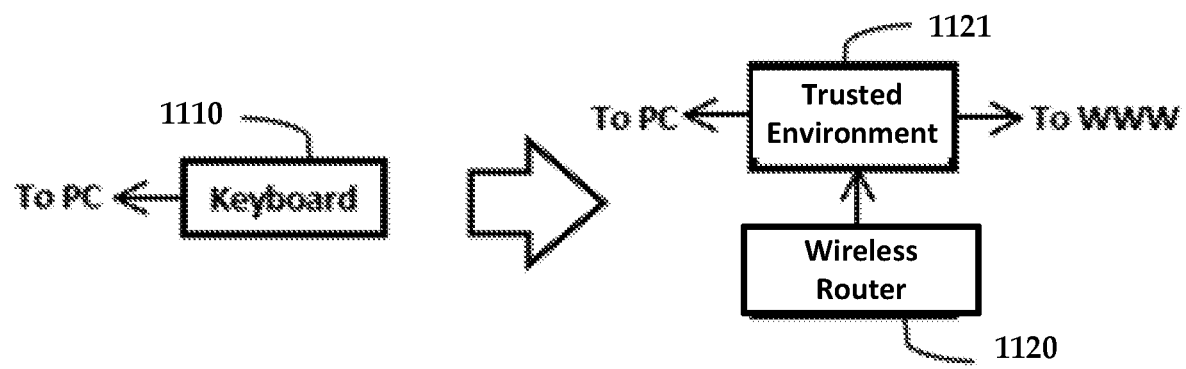
FIG. 11 is a schematic diagram of an example network device, such as a home wireless router (access point) that has been modified by the addition of a trusted computing device therein.

FIG. 11 is an example of the modification of a home wireless router with a trusted environment module. Similar to modifying the keyboard in FIG. 10, other peripherals may be modified to serve as a trusted environment device. In this example, the keyboard 1110 (e.g., legacy device) is modified by adding to it a connection to the trusted environment 1121 for the wireless router 1120. Other peripherals may be connected to the wireless router 1120 via the trusted environment 1121 and allow desired security as designed by the manufacture. In this specific configuration, password protection and other security functions may be implemented.

Figure 12:
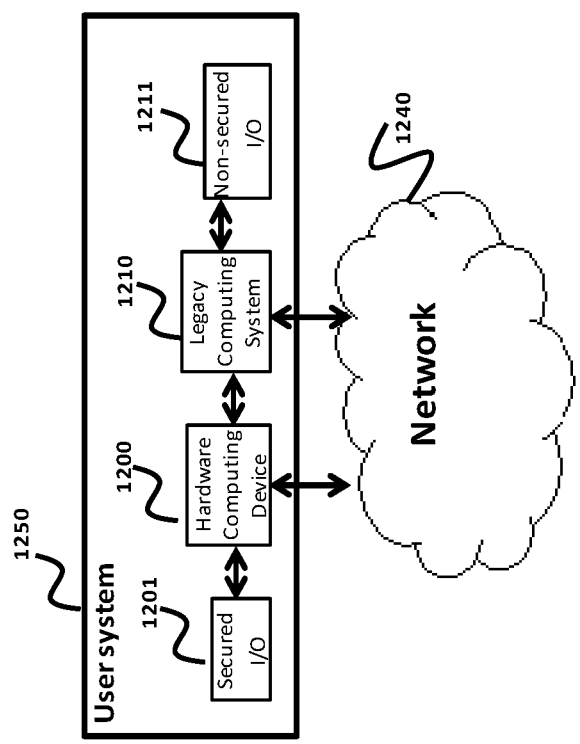
FIG. 12 is a schematic diagram depicting the user computing systems which include a hardware computing device connected to a legacy system and the secured Input/Output (I/O) connected to the hardware computing device. Both hardware computing device and legacy computing system connected to the network.

FIG. 12 depicts components of an exemplary user system 1250 as modified to accommodate security features. Shown in FIG. 12 are secured I/O (input or output) devices 1201, hardware computing device 1200, legacy computing system 1210, non-secured I/O 1211, and a network 1240. A hardware computing device 1200 is added to an off the shelf legacy computing system 1210. Secured I/O devices 1201 connected to the hardware computing device 1200. Other I/O devices 1211 may be connected to the legacy computing system 1210. The hardware computing device 1200 and the legacy computing system 1210 are connected to the network 1240. The network 1240 may be implemented also as direct communication of peer to peer connection, wired or wireless.

The hardware computing device 1200 is connected and communicates to any of secured I/O devices 1201: keyboard, mouse, camera, microphone, touch pad, touch screen, biometric device, display, speaker, network communication device, input device, output device or combination thereof.

The input device 1201 is communicatively coupled with the hardware computing device 1200 and the secured input device 1201 transmitting secure data to the hardware computing device 1200 without the legacy computing system 1210 having access to the secure data.

The hardware computing device 1200 transmits secure data to the network 1240 communicating with other networked computing systems without the legacy computing system 1210 having access to such data.

The secured operation of the user system 1250 is attained by having the data from or to the secured I/O 1201 communicating from the user to or from the legacy computing system 1210 through the hardware computing device 1200 allowing for monitoring, blocking, altering, or redirecting of user data and fully controlling the information that is transmitted from the hardware computing device 1200 to the legacy computing system 1210.

The hardware computing device 1200 executes programs and instructions stored in its memory. The hardware computing device 1200 executing secure functions and processes, without the legacy computing system 1210 having access to data in the hardware computing device 1200.

Without limiting the functionality, examples of secured functions executed or carried out by the hardware computing device 1200 are listed below. A person skilled in the art could use the hardware computing device 1200 to execute other processes, any of:

a. Authentication and identification module or function
   b. Transmitting secure data to the network, communicating with other networked computing systems without the legacy computing system 1210 having access to such data.
   c. Encryption and decryption functions.
   d. Comparing characters and bits strings from secured input device 1201 to stored information.
   e. Blocking data from reaching the legacy computing system 1210.
   f. Altering the character strings transmitted to the legacy computing system 1210 to enable seeding.
   g. Warn the user on suspicious operations with secured output 1201 means such as LED (light Emitting Diode).
   h. Voice and image recognition.
   i. Secure handling of sensitive information and data.
   j. Emulating secured I/O 1201 peripherals to be transmitted to the legacy computing system 1210

The hardware computing device 1200 communicates with network computing systems and the hardware computing device 1200 executes any of functions: receiving data, sending data, processing data, and transferring data to a legacy computing system 1210.

The hardware computing device 1200 is designed to communicate with any of input device, output device, a keyboard, a switch, a microphone, a camera, a fingerprint scanner, a biometric device, a GPS device, a LED, a speaker, a display.

The legacy computing system 1210 may be, but is not limited to, any of computing system, PC, notebook, tablet, server, smartphone, Programmable Logic Control (PLC), router, point of sale terminal, monitoring station, maintenance station, programmable logic controller, wired or wireless router or combination thereof. An I/O device, 1201 or 1211, may be, but is not limited to, any of keyboard, mouse, pad, camera, display, microphone, speaker, and biometric means: iris, finger print, etc. or a combination thereof. The network 1240 may be, but is not limited to, any of wired, wireless, LAN, Internet, Wide Area Network (WAN), peer to peer or combination thereof.

The hardware computing device 1200 may be incorporated in input or output means or devices where the incorporated hardware in such devices could carry the hardware computing device 1200 functionality as described above.

Figure 13:
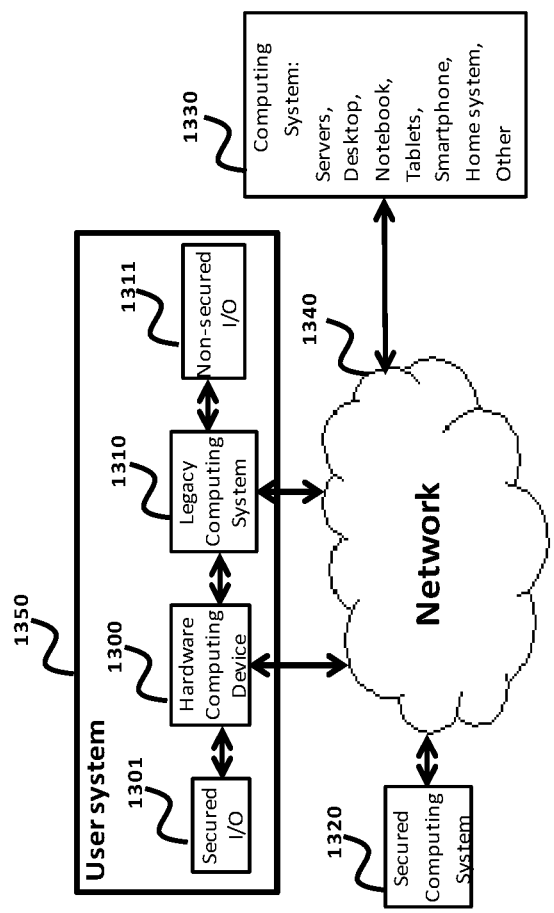
FIG. 13 depicts a schematic diagram of the network which includes the user system, a secured computing system that provides secured services to the user, and additional optional computing systems that participate in the network.
Figure 14:
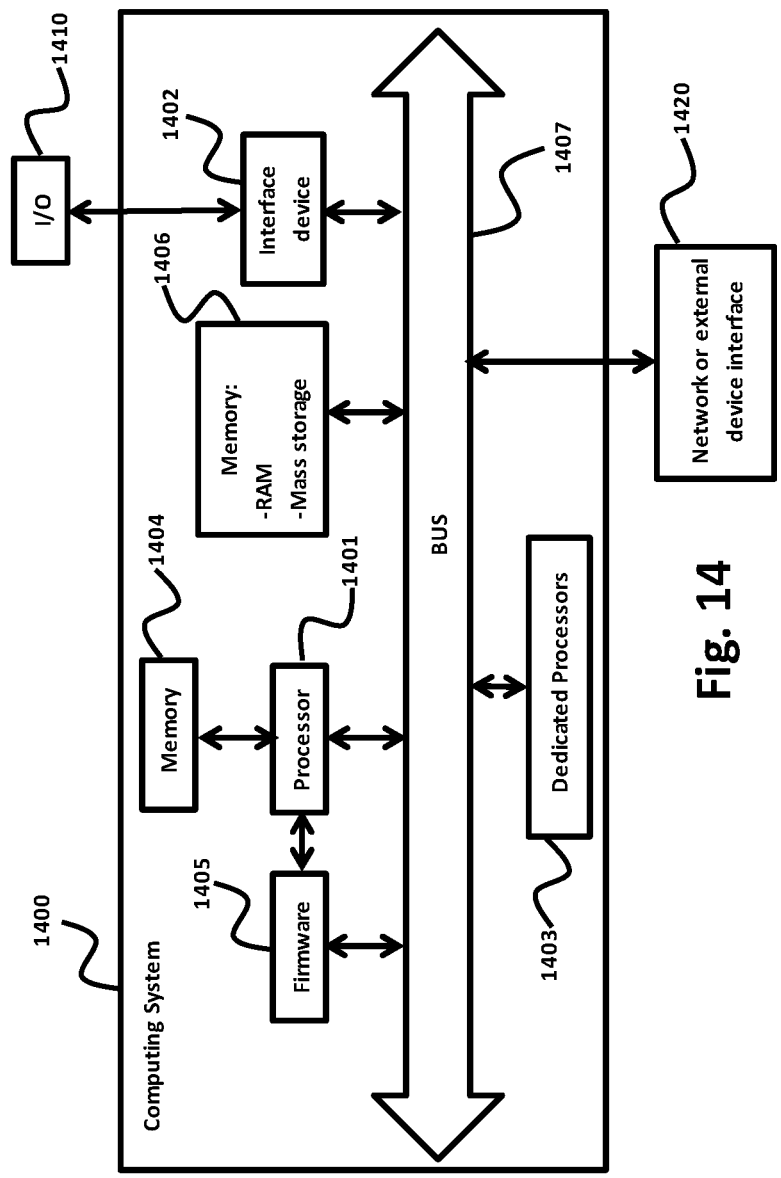
FIG. 14 is a schematic diagram depicting the key components of a typical legacy computing system which are included in the endpoints of the network.

FIG. 13 depicts an exemplary typical network computing systems (a typical computing system is depicted in FIG. 14) that utilizes the innovation which encompasses the following components (as used later in the claims). Shown in FIG. 13 are secured I/O 1301, hardware computing device 1300, legacy computing system 1310, non-secured I/O 1311, secured computing system 1320, computing system 1330, and network 1340.

Hardware computing device 1300, which is added to a legacy computing system 1310, is key to the innovation and manages handling of sensitive data and identification of objects such as, but not limited to: passwords, identification means of the user—images, videos, voice, finger print, iris patterns, characteristic keystrokes, etc.

Secured I/O 1301 are connected directly to the hardware computing device 1300, allowing for secure user interaction by separating such secured I/O 1301 data from the legacy computing system 1310 since the legacy computing system 1310 could be infected with malware.

The computing device 1300 communicates with the legacy computing system 1310.

The computing device 1300 has direct interface to the network 1340, allowing it to communicate with the secured computing system 1320

Legacy computing system 1310 may be, but not limited to, any of server, PC, notebook, tablet, smartphone, router, home system or combination of, that allow user communication to the network 1340.

Exposed non-secured I/O 1311 is connected directly to the legacy computing system 1310 and since this computing system may be infected with malware it makes the non-secured I/O 1311 exposed to hacking.

The legacy computing system 1310 has direct interface to the network 1340, allowing it to communicate with any computing system 1330 and/or the secured computing system 1320.

Network 1340 allows for communication between the various computing systems 1330 that are connected to the network 1340. The network 1340 may be any of but not limited to: Internet/World Wide Web (WWW), corporate wireless or wired Local Area Network (LAN), home automation, industrial, transportation, in car, peer to peer or combination thereof.

The secured computing system 1320, a typical configuration depicted in FIG. 14, connected to the network 1340, will typically host a site: a collection of programs that allow it to carry out various applications to process data and provide services, such as but not limited to: Manage passwords, open accounts, manage access to accounts, detect hacking attempts, encryption/decryption, identification and authentication. It is important to realize that a computing device attached to a certain legacy computing system 1310 may communicate with more than one secured computing system.

The hardware portion of the secured computing system 1320 is typically a server, on the internet or corporate network, control unit of home automation, central processing unit of a car, or similar device.

The secured computing system 1320, comprising any of a computing system, a legacy system, a trusted system, a hardware computing device, a server, etc. that executes a program further comprising any of a session with a hardware computing device 1300, a session with a legacy computing system 1310, a session with another computing system 1330 on a network 1340, a management program that integrates all programs into a single user session or combination thereof by means of a single or multiple IP addresses.

Computing system 1330 is a plurality of systems (based on computing system as detailed in FIG. 14) that are implemented as computing systems, as described in FIG. 14. They may be, but not limited to: servers, desktop, notebook, tablets, smartphone, home systems, sensors, actuators, routers, modems, printers, cameras, etc.

The hardware computing device 1300 communicating directly to any of the secured computing system 1320, another secured computing system or via the legacy computing system 1310.

The hardware computing device 1300 connected to secured I/O 1301 that allow a user to directly communicate with the secured computing system 1320 or another secured computing system.

The secured computing system 1320 executing a user session initiated in the user's computing system, the user's computing system further comprising the legacy computing system and the hardware computing device, the session supported by means of multiple internet protocol addresses.

The secured computing system 1320, wherein the secured computing system 1320 serving as a remote personal computer to allow a user of a hardware computing device 1300 and a legacy computing system 1310 to access internet sites.

The secured computing system 1320, wherein evaluation of legacy computing system 1310 against hardware computing device 1300 is carried out continuously in real time.

The secured computing system 1320, wherein the legacy computing system 1310 presents to the user information communicated from the secured computing system 1320.

FIG. 12 depicts the components of the computer system used by a user to communicate over the network—such as internet, corporate, or even at home. Hardware computing device 1200 and legacy computing system 1210 are two computing systems (as depicted with a general architecture in FIG. 14) that are used seamlessly by the user, as one. The user is not aware of which one carrying certain applications and the collaborative nature of the two computing systems. The hardware computing device 1200 carries the secured tasks while the legacy computing system 1210 carries all other tasks and to which applications or data from the internet may be downloaded, so infection by malware may be caused only to the legacy computing system 1210. Secured I/O 1201 peripherals are connected to the hardware computing device 1200 and non-secured I/O 1211 peripherals, which do not require secured operation, are connected to the legacy computing system 1210.

FIG. 14 depicts an exemplary structure of a typical computing system 1400, which represents the general architecture of legacy computing systems that are used in all various types of programmable devices. Shown in FIG. 14 are a computing system 1400, I/O 1410, network or external device interface 1420, firmware 1405, processor 1401, memory 1404, memory 1406, interface device 1402, dedicated processors 1403, and BUS 1407. This is provided just for the clarification of what is meant when the term computing system is used. A computing system in general terms is a system that receives and transmits data (1410, 1420). The data may be processed (1401, 1403) and/or stored (1404, 1406) in it. Processing is made possible by programs written to be executed by the processors (1401, 1403) (and other components). It is typical in the sense that it depicts the key elements of a computing system. Most of actual implementation will have variants of this architecture but for any one expert in the field it would be easy to identify such variants as computing system. The structure of the various computing systems, including the computing device, is similar and encompasses a typical computing system elements: Hardware such as, but not limited to—processor (1401), dedicated processors 1403, memory (1404, 1406), interface-devices/communication-devices: the BUS 1407, the interface device 1402, and I/O 1410 (could be a keyboard, camera, biometric device, mic, display and any other), and network interface 1420, firmware 1405, etc.; and software such as, but not limited to, operating system(s), boot programs, application programs, etc.; application programs such as, but not limited to, password detection, encryption/decryption, image/video processing, voice/audio recognition, network communication, games, payment applications, etc.

Various communication outlets, interface devices 1402, connect to external devices such as—USB, High-Definition Multimedia Interface (HDMI), memory card socket, display socket, etc.

Some computing systems might have I/O 1410 devices, such as keyboards, mouse, display, camera, microphone, speakers, biometric, touch screen, etc. It should be emphasized that numerous computing systems operate without I/O.

The network or external device interface 1420 connects to other computing systems via a network or directly. The network may be any of wireless, wired, LAN, WAN, Internet, cellular, peer to peer or combination thereof. It should be emphasized that some computing systems are not connected to networks or external devices.

Reference to computing systems in general will usually depict this architecture with all or part of the components.

Figure 15:
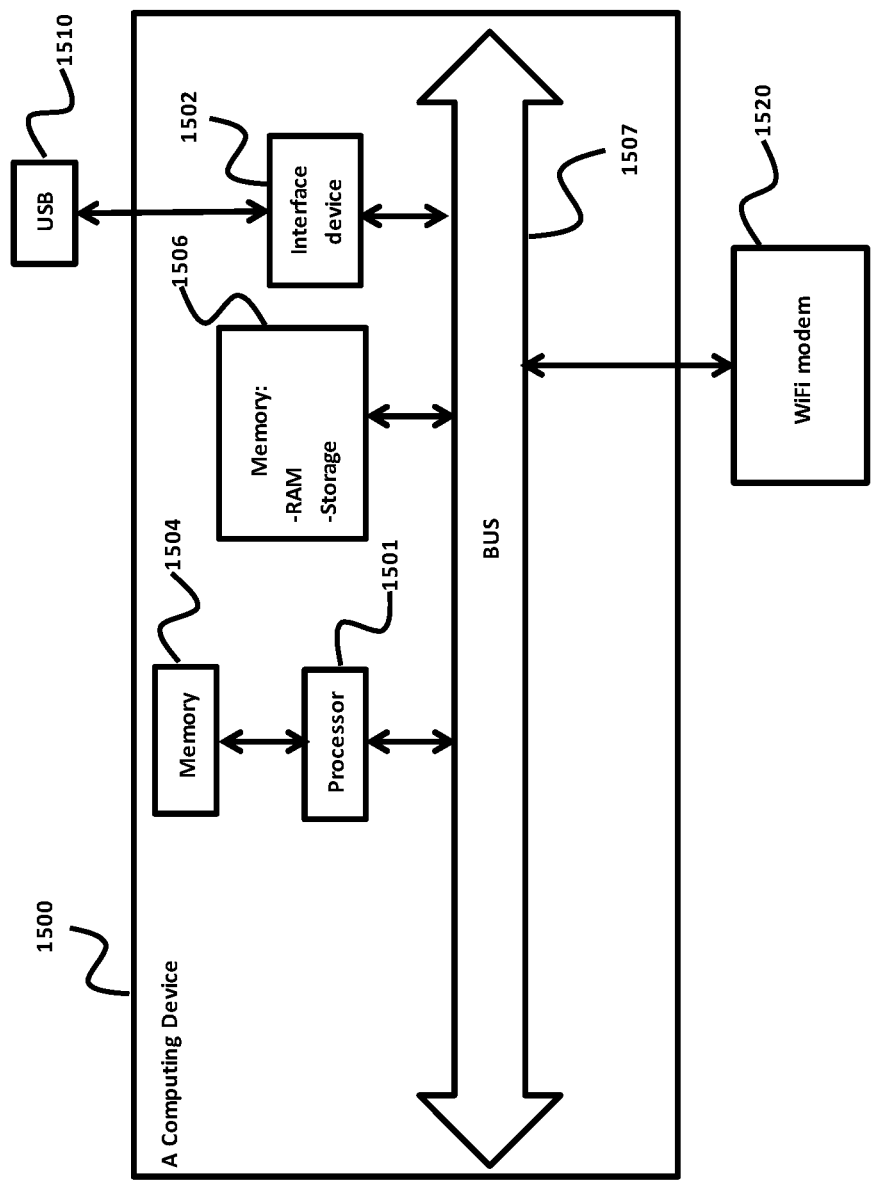
FIG. 15 is a schematic diagram depicting an example of the key components of a simple hardware computing device.

FIG. 15 depicts an exemplary embodiment of a computing device 1500. Shown in FIG. 15 a computing device 1500, USB 1510, WiFi modem 1520, processor 1501, memory 1504, memory 1506, interface device 1502, and bus 1507. Such device has the basic components to support the computational, storage, and communications means to provide certain security functions, such as password protection. Other embodiments may include additional I/O incorporated in the device or interface supported by the device.

The computing device 1500 includes the typical components of a computer system. Key components of the computing device include processor 1501, memory 1504 attached to the processor 1501, memory 1506 that support the processing storage and data storage, interface device 1502 to support I/O peripherals, more than one interface device like this might be used to support multiple devices. In a certain embodiment a USB 1510 (keyboard device emulation) interface to enable communication to the legacy system and another USB 1510 (keyboard host) to interface a keyboard, as depicted in general terms and described in FIG. 1, and as example a WiFi modem 1520 that enables the communication to the internet. It should be emphasized that the USB 1510 I/O and WiFi modem 1520 network connections are just examples: The USB 1510 I/O interface may be Secured Digital (SD) memory card interface or other and the network connection may be Ethernet, cellular, or others. The BUS 1507 allows for the processor 1501 communication with the entire computing device components—transferring data to and from these components.

The hardware computing device may communicate directly with the legacy computing system to which it is attached or other legacy computing systems via the network interface or any other type of communication—in any case not limited to the USB 1510—it could be Bluetooth, WiFi, etc.

The computing device 1500 may contain an identification characters string that may be stored in it during the manufacturing of the device or later during the initialization process by the secured computing system. This identification string, object, may in some embodiments be modified later by the secured computing system.

A computing device 1500 may communicate with more than one secured computing system, such as the service site offered by the manufacture of the computing device, banks, social networks, medical and government institutes, or any site that requires a secured access, such as password as identification. As mentioned more than once, the identification means may take various forms by use of various identification objects.

The computing device 1500 may contain a hardwired identification character string that allows secured computing system to identify it uniquely when the computing device communicates with it.

The connection of the keyboard, and for this matter to any other input or output device may be other communication means, such as Bluetooth, WiFi, ZigBee, or even the network. There might be some security risks arising from such implementations.

A password may be communicated to the computing device 1500 by means other than keyboard, voice stating the characters string by means of a microphone—the voice may serve as a means to authentication of the user by means of voice recognition. It could also be a display of the character string which is captured by a camera and by means of Optical Character Recognition (OCR) decoded—user face may add an authentication means.

Figure 16:
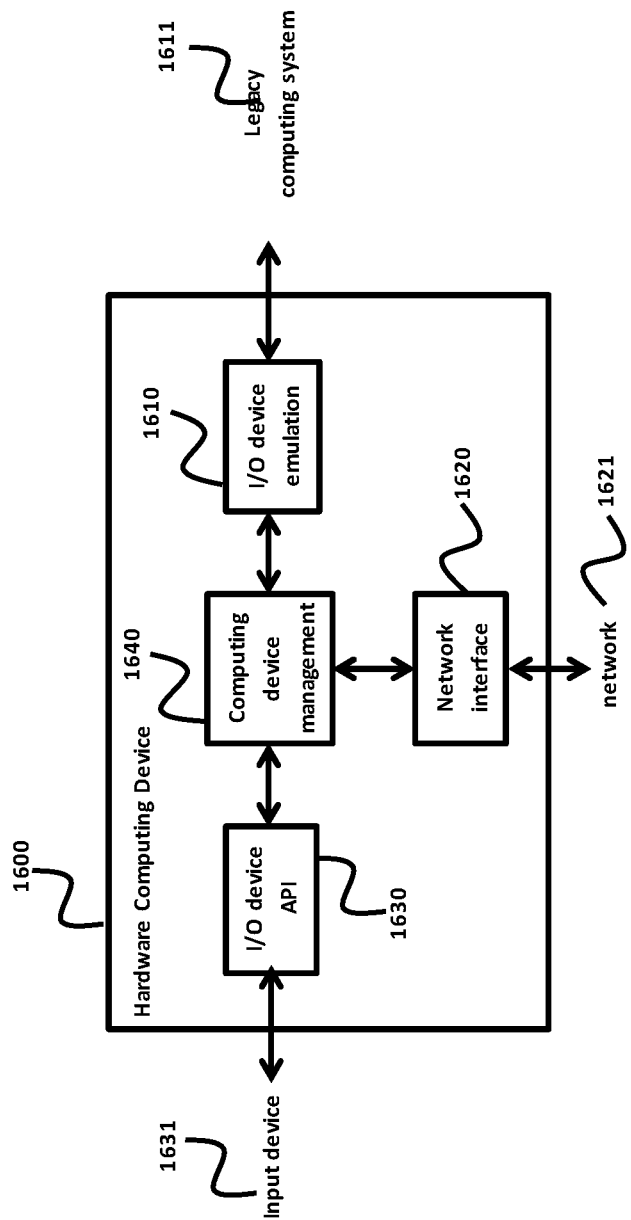
FIG. 16 is a schematic diagram depicting a simple hardware computing device functional diagram in which the input device connected to the hardware computing device is emulated to transmit input device altered/emulated data to the legacy computing system.

FIG. 16 depicts an exemplary description of a hardware computing device 1600 that is added to an off the shelf system to implement security tasks. Shown in FIG. 16 a computing device 1600, from input device 1631, to legacy computing system 1611, to network 1621, I/O device API 1630, computing device management 1640, I/O device emulation 1610, and network interface 1620. This is an example of a device that supports a range of security related functions. Conceptually any security requirement may be supported, from basic password protection to full safe encryption even when the legacy computing system is infected with malware. For password protection, a detailed specific circuitry will be discussed in FIG. 17. Here will be elaborate on the encryption implementation. The description will include the minimal requirements for such implementation and anyone skilled in the art could apply the approach to any desired data or application/program which requires protection. To provide minimal encryption capacity a keyboard and display are connected to the computing device 1600 by the means of the I/O device API 1630. The keyboard, from Input device 1631, strokes are displayed on a display component connected to the hardware computing device 1600. In regular operation the keystrokes are transferred by the computing device management 1640 directly to the I/O device emulation 1610 that appears as a keyboard device to the legacy computing system 1611. When encrypted messages needed to be sent, this mode of the computing device 1600 is select by the user to avoid transmission of the keyboard strokes to the legacy system and enable the display on the display. The computing device management 1640 will carry the encryption and the encrypted character string may be transmitted to the network 1621 by means of the network interface 1620. It is clear that various implementations may be supported with the utilization of various I/O devices, from input device 1631, connected to the computing device 1600. One additional example—by using a camera, microphone, and speaker as output device connected to the I/O device API 1630 of the hardware computing device 1600 and the network interface 1620, secured video conferencing is possible over the internet, the network 1621. Of course, proper programming of the computing device management 1640 will support the videoconference application. For setting up the connection, to legacy computing system 1611 may be used.

Typically, the design will attempt to avoid any updates and upgrades of the computing device over the network 1621. In case of design that allow such updates and upgrades they will be made only from a very limited number of sites, preferably only one, greatly protected link of communication between the computing device 1600 and the secured computing system 1320.

The computing device 1600 may be used as standalone—meaning without interfacing the Keyboard (KB) to the legacy computing system 1611 that uses a keyboard that is a component of the legacy computing system. This implementation is less secured than the one that interfaces the keyboard via the hardware computing device 1600 to legacy computing system 1611 by taking advantage of the identification string embedded in the computing device 1600.

The computing device 1600 may also be used to interface the legacy computing system 1611 to the network. This structure would allow for monitoring the communication of the legacy computing system 1611 to the network, for example allow for protection of a firewall white/black lists from being modified by malware infecting the legacy computing system 1611. It will also improve encryption by preventing exposure of encrypted files to the malware and thus avoiding exposure and recovery of encryption codes.

The hardware computing device 1700 includes any type of memory means, RAM, Flash, Read Only Memory (ROM), hardwired, firmware or combination, etc.

The hardware computing device 1700 storing in the device memory any of data, passwords, encryption codes, account numbers, credit card numbers, social security number, ID values, images, video, voice, audio, URLs, black and white lists, contact lists, email contacts, sensitive records, finger prints, iris image, digital signature, hardware computing device ID number, GPS location, etc. without the legacy computing system having access to the memory.

The data stored in the hardware computing device 1700 memory may be acquired with any of an input device, the legacy computing system or another legacy computing system, data from a network, another hardware computing device, etc.

Figure 17:
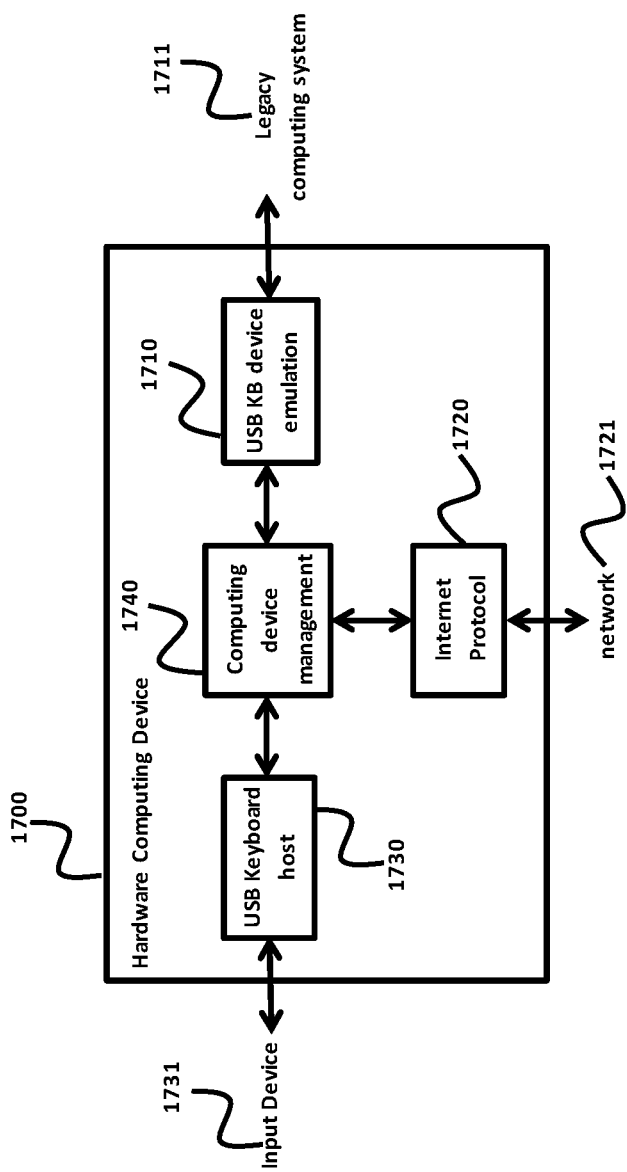
FIG. 17 is a schematic diagram depicting a hardware computing device embodiment of a Universal Serial Bus (USB) keyboard implementation to support a range of secured functions.

FIG. 17 depicts an exemplary embodiment of a USB based hardware computing device 1700. Shown in FIG. 17 a hardware computing device 1700, from input device 1731, to legacy computing system 1711, to network 1721, USB keyboard host 1730, computing device management 1740, USB KB device emulation 1710, and internet protocol 1720. The functionality in this case might focus on password protection and in general allowing for access management when operating with a collaborating web site on the network 1721. A USB keyboard host 1730 allows connecting a keyboard, from input device 1731, to the hardware computing device 1700. Keystrokes are received by the computing device management 1740 and may be manipulated by the computing device management 1740. The computing device management 1740 interfaces to legacy computing system 1711 by means of USB KB device emulation 1710. The hardware computing device 1700 is viewed by the legacy computing system as a regular keyboard. The hardware computing device 1700 is communicating also with a web site on the internet, to network 1721, by means of the internet protocol 1720. This connection may be implemented as WiFi, Ethernet, or any other preferred network connection.

Usually the keystrokes of the keyboard, from input device 1731, are transferred to legacy computing system 1711. The computing device management 1740 runs a program to detect that a password is keyed. When a password is keyed, it is blocked from the legacy computing system and the connection to the collaborating web site is verified. If there is a connection, the password is sent to the site. In any case, an altered version may be sent to the legacy computing system and a web site for future detection of its use by a hacker/malware, in case malware is eavesdropping on the communication between the computing device 1700 and the legacy computing system 1711. Later details of the web site operation will be discussed in more details. In case password is keyed when there is no connection to the web site it raises suspicious, that malware may be tricked the user, that there is presence of malware in the legacy computing system 1711.

The hardware computing device 1700 may be used in additional ways, such as a standalone device connected to legacy computing system 1711 where the keyboard is embedded in the legacy computing system.

The hardware computing device 1700 may be also used to interface legacy computing system to network 1721, allowing the securing of more applications, such as firewall and encryption.

Figure 18:
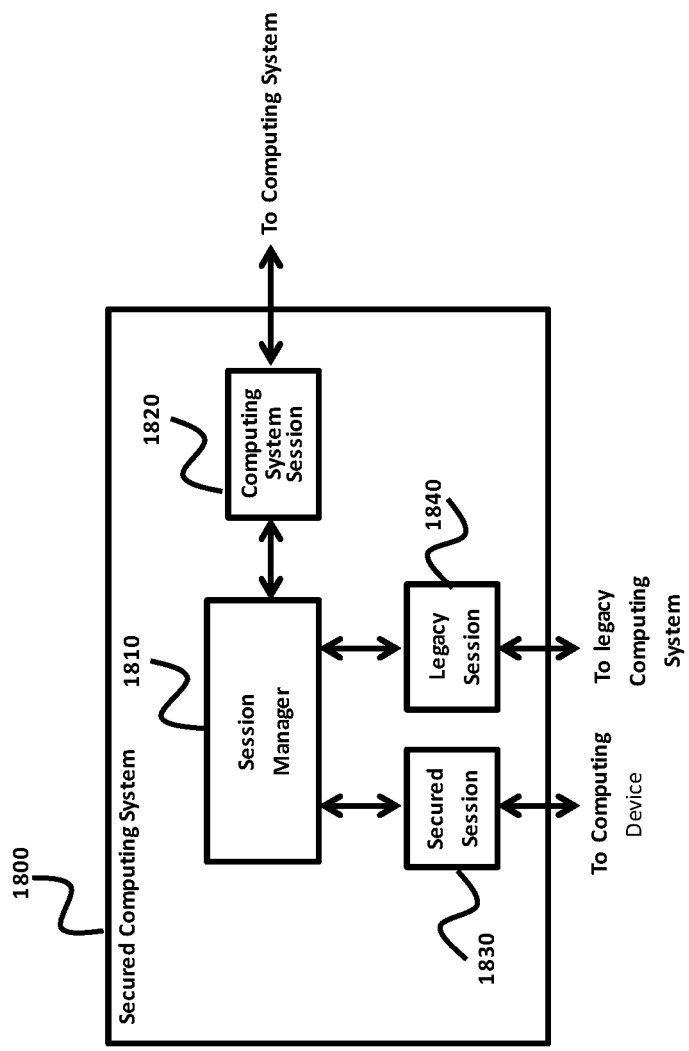
FIG. 18 is a schematic diagram depicting the key software components of a secured computing system functional diagram that is designed to provide services to the user.

FIG. 18 depicts an exemplary functional description of the Secured Computing System 1800. Shown in FIG. 18 is a secured computing system 1800, a secured session 1830, a legacy session 1840, session manager 1810, and computing system session 1820. The purpose is to allow safe (secured) communication of users to websites on the network (computing system 1330 in FIG. 13). Such system is based on a typical computing system as depicted in FIG. 14. It includes hardware and software. The components described as part of the secured computing system 1800 in FIG. 18, are the software components. This could be a modified web site, as explained here after, that runs on a server connected to a network such as the internet or corporate, on a cloud server or server farm or corporate server. The implementation does not need to be based on the web site approach but could be programs developed without relying on previous developments. The implementation is by integration of software programs that run on the computing system hardware. The service of the Secured Computing System 1800 is achieved by a set of programs that allow the handling of two sessions, secured session 1830 and a legacy (unsecured) session 1840, both operated for a user which seamlessly views them as one, operating the user system 1250 as depicted in FIG. 12 and the computing system session 1820 that is connecting to another web site. The session manager 1810 is a set of programs that manage the operation of the various sessions to allow for secured operation of the user interfacing a site on the network.

The computing system session 1820 may be structured to interface a secured system on the network, which incorporates the features of trusted and legacy environments. In such case it will act with a secured (trusted) and legacy (unsecured) sessions with the other system on the network.

The session manager 1810 allow for the splitting the communication from the computing system session 1820 into two sessions, a secured (trusted) session 1830 that mainly receives information from the hardware computing device 1200 (in case the hardware computing device 1200 have means for display, speaker, or others, the secured session 1830 could also send information to the hardware computing device 1200) utilizing the communication protocol, which on the internet will be the IP type. The Legacy (unsecured) session 1840 communicates with the legacy computing system 1310. It will allow for advanced displays and multimedia interaction with the user even for secured communication, where the sensitive data is managed and communicated to the user by means of the secured (trusted) session 1830.

The user session comprising either of a secured session 1830 executed by means of the hardware computing device or a non-secure legacy session 1840 executed by means of the legacy computing system.

The secured computing system allowing the user to communicate securely with any of a networked computing system, the legacy computing system or another computing system, a server, a site or a combination thereof.

The secured computing system 1800 allowing secured action and service any of opening an account, login to an account, access to another networked computing system, payment, fund transfer, review and transfer documents, process information received from the hardware computing device or from the legacy computing system, evaluating data from the legacy computing system with reference to data from the hardware computing device, displaying information communicated to the legacy computing system for the user review, masking information to be sent to the legacy computing system to allow only the user to view it and avoid malware from interpreting it or combination thereof; the secured computing system executing any of authentication of user, actions, operations, defeating or seeding of malware, hacker, etc. taking advantage of simultaneous communication via two channels to the hardware computing device and the legacy computing system by any of storing user credentials including any of passwords, token values, cookies, pictures, audio, credit card, social security, ID numbers, hardware computing device ID, URLs, seeded information, etc.

The secured computing system 1800 by means of the Session manager 1810, comparing information received from the legacy computing system to the information received from the hardware computing device, detecting attempts by malware or hacker by means of seeded information, block or redirect malware or hacker access, locate hacker in real time, retaliate against hackers, etc.

An example of the use of the secured computing system 1800 is the password protection to access a remote computing system 1330 (web site) by a user with a computing system as depicted in FIG. 1A. Normally the keyboard, secured I/O 1301, strokes will be transferred directly to the legacy computing system 1310 via the hardware computing device 1300. The hardware computing device 1300 continually monitors the strokes. When a password is detected, the keystrokes are blocked from delivery to the legacy computing system 1310. If the device is connected to the secured computing system 1320 that provides the service, than the password is transmitted to it. In any case, the hardware computing device 1300 creates a character string that is delivered to legacy computing system 1310 and also to the secured computing system 1320. The string is unique and used by the secured computing system 1320 to detect hacking attempts and secured system attacks in real time, identifying the time, system, and user where the attempt to copy the password was taking place.

The computing device 1300 may communicate with the legacy computing system 1310 via the secured computing system 1320 enabling such functions as display of the character strings from the user on the display of his system (or modified).

Corporations, such as banks or internet Facebook, Google may be interested in captive services to their customers. In such implementation the Secured Computing System 1320 will be the Computing System 1330, and will create the secured session 1830 and the legacy session 1840.

Here after are several uses that might not be apparent from the previous descriptions but they are clear to an individual knowledgeable in the art.

The hardware computing device 1300 may be a USB device and may operate without a keyboard, secured I/O 1301, connected to it. In such cases the user submits a password to the secured computing system 1320 by means of the legacy computing system 1310 and a keyboard, non-secured I/O 1311, and is risking the exposure of his password. The user will be still protected when connecting to the web site (secured computing system 1320) with the computing device 1300 which is part of his user system as depicted in FIG. 12, since the device ID number is sent directly to the secured computing system 1320 and is not exposed to malware in the legacy computing system 1310. This may refer to as out of band two factor authentication of the user.

The legacy computing system 1310 may be designed to connect to the network 1340 through the computing device 1300. The internet interface is made via the hardware computing device 1300. It allows for effective monitoring of the communication with regard to various aspects—URLs, load, anomalies, etc. It also allow for support of various applications such as firewall, email, encryption—by providing protection of lists (black and white for the firewall, contacts for email, encryption codes for the encryption programs). It could also support higher level of security by taking advantage of a keyboard connected directly to the hardware computing device 1300 not accessible to the legacy computing system 1310.

A trusted electronic wallet may be implemented by means of the hardware computing device 1300, The computing device 100 may be designed to protect the network 1340 from attacks by the legacy computing system 1310 (BYOD—Bring Your Own Device) by adding display (such as LEDs) or actuation (such as switch) that allow the legacy computing system 1310 access the network only if the user approves it, preventing malware infecting it from accessing the network 140 without user consent or knowledge.

A combination of two hardware computing devices 1300 connecting administrator to the corporate servers, authenticating administrator communication to the servers and defeating malware attempts without administrator consent or knowledge.

A keyboard may be designed in such way that the hardware computing device 1300 is integrated in it providing the password protection.

A dedicated keyboard-like-device may be designed as a hardware computing device 1300, for password (PW) protection.

The hardware computing device 1300 may store Identification object by means of secured I/O 1301 (such as keyboard, or camera, or microphone or any biometric device . . . )—identification object to be password, image, video, audio, voice or any other type of identification means.

The example used to describe the handling of passwords to prevent exposure and as means for seeding (creating string of characters that are copied by malware and later when a hacker uses them, to allow detection of such attempts in real time) may apply also to other pieces of information such as URLs, video/images, audio, biometric, location . . . such information will be also sent directly by the computing device to the secured site (of course the means that create them will be connected directly to the computing device to avoid exposure.

If upgrades to the computing device are designed for the system, the safe connection to a single site (the secured computing system) reduces greatly the possibility of infection since such downloads are made only from one site and not shared with all other downloads, as the legacy computing system does by sharing the same key hardware between all the applications.

The hardware computing device 1300 may incorporate means to indicate malware warning, password detection, biometric authentication image/video, voice, etc. It also may operate with voice commands and interactively.

In the case of using voice commands, a keyboard will not be required to maintain high level of security.

As mentioned, passwords are not the only identification object that may be used. Images, video, voice, biometric, etc. may be used to authenticate the user by the secured site, send directly by the computing device, and by altering the identification object by the computing device and then transferred to the legacy computing system so in case of infection by malware attempting hacking, the use of such altered identification objects later will indicate hacking attempts in real time, by the secured computing system.

Other items that may be treated like the password example, as sensitive information, are also credit cards numbers, social security numbers, funds amounts, account numbers, URLs, or any others as desired. The computing device may get a user specific command for such sensitive information treatment. The key is that the information is provided by the computing device (if stored or entered by the user) directly to the secured computing system and an altered version to the legacy computing system.

As POS (Point of Sales) exposure gets widely taken advantage of, means of computing device may utilized (or incorporated as an integrated component) to protect the sensitive information—credit card, sales persons credentials, user information (address, telephone number, email etc.) and others. Information related to items costs and codes may be handled in the legacy computing system portion of the POS.

Figure 19:
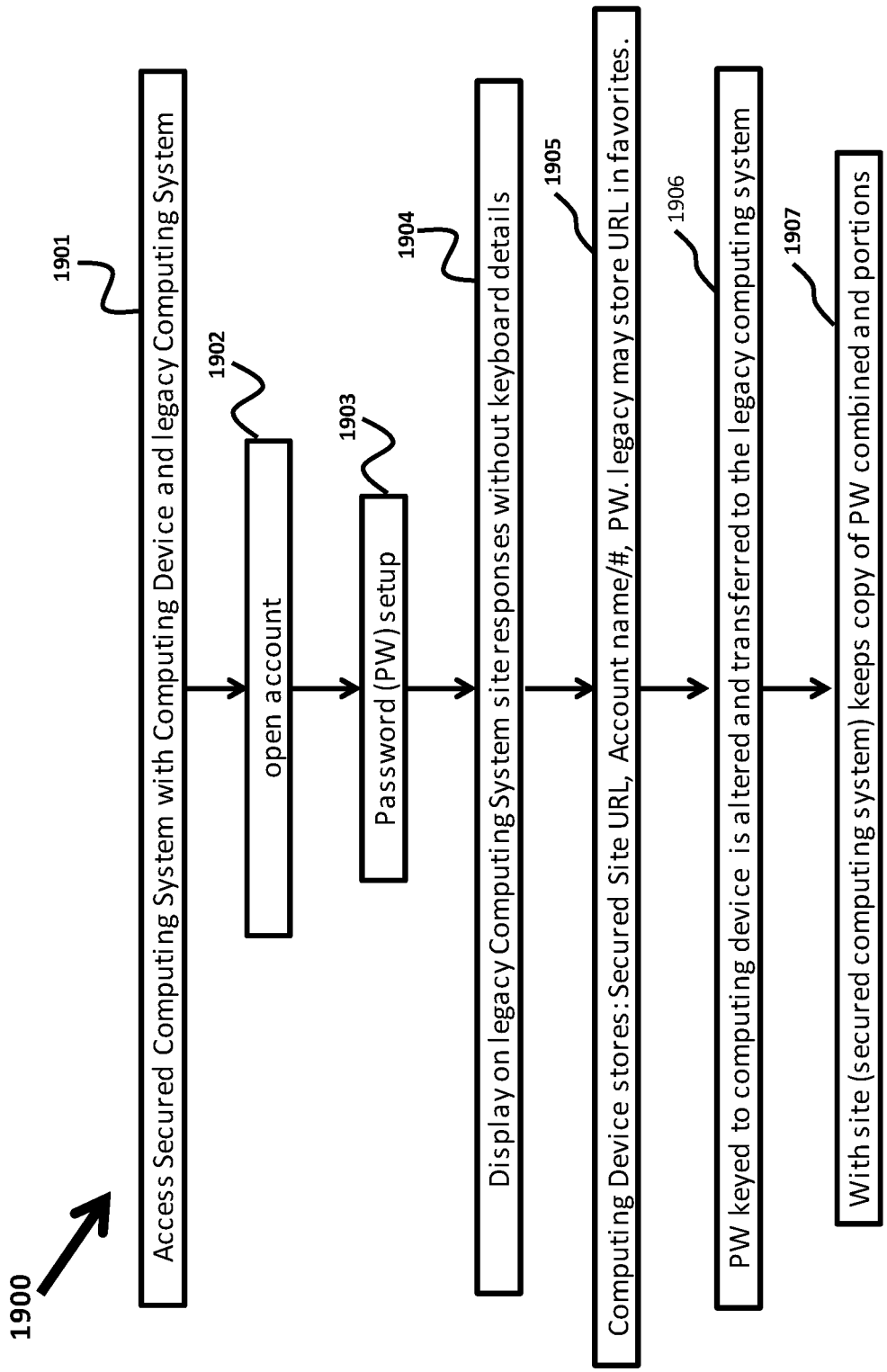
FIG. 19 is an exemplary flow chart of account setup by the means of the secured computing system and a user system.
Figure 20:
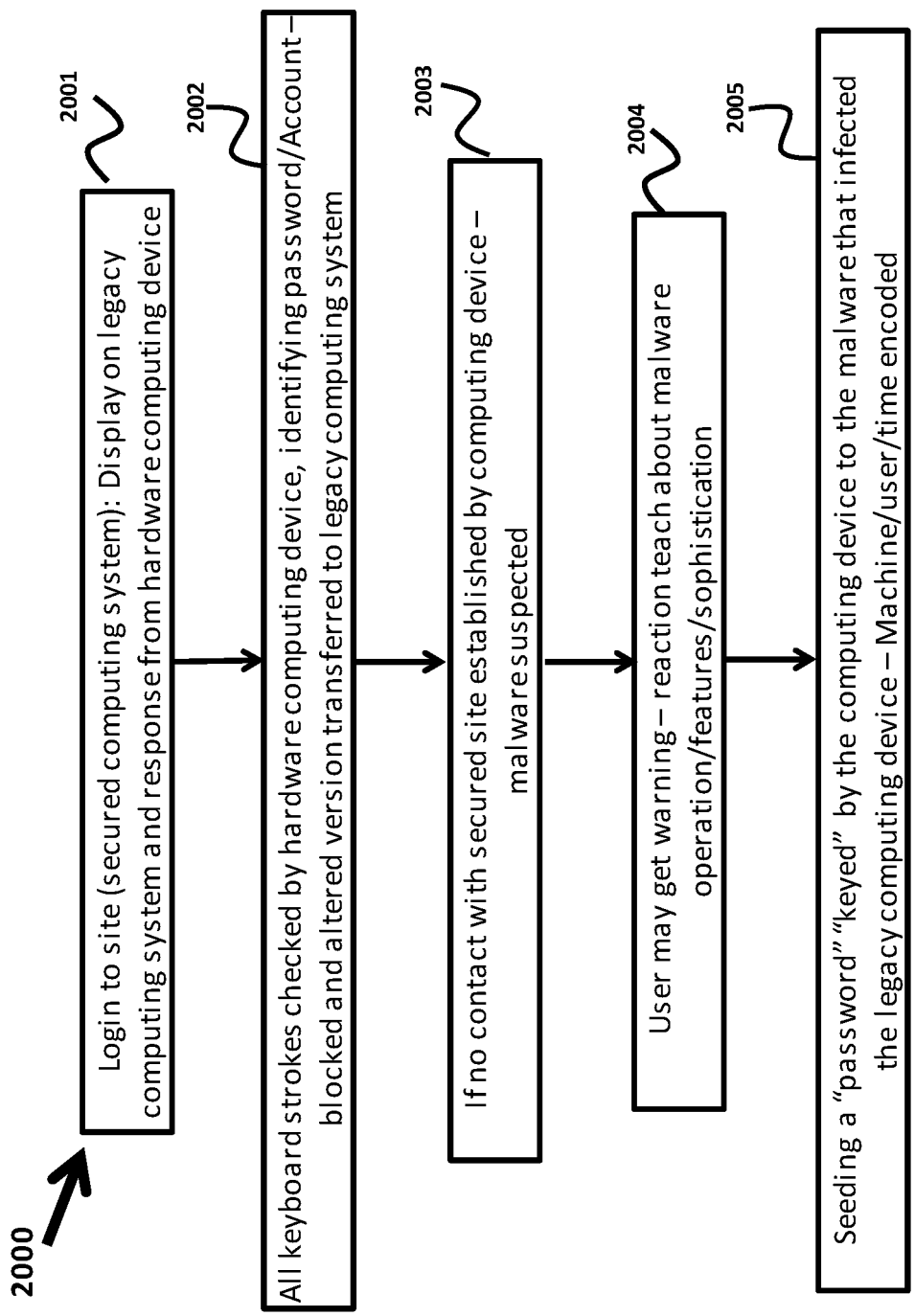
FIG. 20 is an exemplary flow chart of secured access to an account by means of a secured computing system and user system.

FIG. 19 and FIG. 20 Depicts flow charts of examples how the secured computing system 1320 (a web site) could be used to secure user's data. This is an example and many other uses are possible. The user system is constructed from at least a keyboard connected to the computing device which is connected to the legacy computing system. Normally keystrokes are communicated to the legacy computing system. In certain events, such as creating or detecting a password, the computing device creates a character strings that is communicated to the legacy computing system.

FIG. 19 depicts an exemplary flowchart and method of an account setup 1900 with the secured computing system 1320. Shown in FIG. 19 are 7 steps of an exemplary account setup.

The first step 1901, the user accesses the secured computing system 1320 from both the hardware computing device 1300 and the legacy computing system 1310. Messages sent from both components of the user system will allow the secured computing system 1320 match hardware computing device 1300 messages to legacy computing system 1310.

Step 1902, an account is opened by the user in the secured web site, where the legacy computing system display is used to communicate with the user for the account opening process. The account name/number (ID) is transmitted directly to the secured computing system and may be stored in the computing device. The account ID may be protected from the legacy computing system, by transferring an altered ID to it. The altered name is also transmitted to the secured computing system, allowing for detection of hacking attempts of the account.

Step 1903, a password is keyed and an altered one is transferred to the legacy computing system. The altered password is also transmitted to the secured computing system. The selected password is transmitted directly to the secured computing system and may also be stored in the computing device. The creation of the password is accompanied with the computing device sending its identification character string—allowing the secured site identifying the computing device as owned by the user. In case lost or stolen, it will prevent the use of the computing device by someone that is not the allowed user.

Step 1904, is the responses of the secured site by means of the legacy computing system are displayed without divulging sensitive information of the user.

Step 1905, the computing device stores information that could serve effectively future access to the account at the secured site, such as: Secured site URL, account name/number, password. The legacy computing system may store the secured site URL in its "favorite."

Step 1906, password keyed to the computing device is altered and the modified password is transferred to the legacy computing system.

Step 1907, the secured computing system (secured web site) keeps copies of password and other information, such as: account ID, the computing device ID—that becomes part of the user password, and altered values with time and user stamps (information).

FIG. 20 depicts an exemplary, typical access to an account of the secured computing system 2000 flowchart and method of protecting a secured string of characters such as password. Shown in FIG. 20 are 5 steps for an exemplary login to an account.

Step 2001, login to the secured web site (secured computing system) is made by means of the legacy computing system display, without divulging sensitive information by providing the altered information to the legacy computing system, not alerting malware of the existing of a secured means to input sensitive information.

Step 2002, in any case all key strokes are monitored by the computing device, allowing for the detection of sensitive information before it is transferred to the legacy computing system, enabling alteration of the information.

Step 2003, if communication with the secured web site is not established when sensitive information is keyed; this is an indication of malware in the legacy computing system making the user providing the sensitive information potentially exposed to other risks and he may be warned of the legacy system infected with malware.

Step 2004, the user may get a warning by means of the legacy computing system or by means incorporated in the computing device. This could serve for teaching purposes and for evaluation of Malware operation/features/sophistication.

Step 2005, as mentioned before, when malware is suspected, the computing device communicates to the legacy computing system altered character strings as if keyed by the user. Those altered strings have—machine, user, time and other stamps.

The imagination of the engineer skilled in the art could lead to many variants of the implementation of credentials and password protection and implementation of the computing device functionality and all other extensions to the innovations described above.

The computing device is programmable, and controls the input devices or output devices allowing for blocking or transferring data from the I/O devices to the legacy computing system, emulating I/O devices to behave accordingly when communicating with the legacy computing system. The computing device programs may alter I/O information that is transferred to the legacy computing system, allowing for tracing such information when used by a hacker that installed malware in the legacy computing system—this operation is termed seeding. Emulation of such peripheral devices that are connected to the computing device and are physically separated from the legacy computing device is essential for the protection of information that is communicated to the computing device and its secrecy is critical and access by the legacy computing system is desired. The implementation may be such that the data is not transferred to the legacy computing system if the user mistakenly attempts such transfer. To transfer sensitive data from input (or even output) devices that are connected to the legacy computing system via the computing device will require a conscious and specific process to be carried out by the user. As example, a password that intended for an internet web site will be never transferred as a string of characters to the legacy computing system from a keyboard connected to the computing device. For the user to get such information to the legacy computing system he will need to key the password with a slight addition and then delete such addition (or part of the password and then edit the string keyed to the legacy computing system, adding the rest of the password string to the portion keyed).

The computing device allow for safe access to computing systems over the network, such as home automation, while utilizing the legacy computing system. This accomplished by secured login followed with safe upgrades—loading programs and/or modifying programs in remote (on the network) computing systems minimize risk of contamination and could be used to repair it.

The legacy computing system may be communicated by a user directly by means of a secured computing system with I/O devices connected directly to the legacy computing system, allowing for authentication. This is accomplished by means of computing device unique identification and direct communications with secured computing systems over the internet. Detection of malware is possible and warning may be provided to user by means of LEDs or displays connected directly to the computing device. There may be input devices connected directly to the computing device allowing for user authentication and authorization. Password detection may be accomplished via secured computing system on the network. Various authentication means may be used connected directly to the computing device or the legacy computing device. There could be use of interactive voice communication via the computing device.

The computing device may be designed with I/O means such as: keys, switches, mic, camera, fingerprint, GPS and other input devices that come to mind. The device may designed with output means such as: LEDs, speakers, displays, or any other mean that comes to mind, supporting secured communication with other computing system.

The legacy computing system may access other computing systems on the network securely. The user may have in certain embodiment remote interfaces that will allow him to access securely remote computing systems on the network by means of a secured computing system. The other computing systems to which the user of the legacy computing system with the secured device is accessing will not be aware or require cooperation with the secured computing system. The user of the legacy computing system with the attached secured device may access securely directly cooperating computing systems, such that contain the proper programs that will support the secured communication.

When a user of a legacy computing system with an attached computing device access a computing system via the secured computing device, a session for communicating securely to the computing system on the network is initiated by means of the secured computing system. The secured computing system is managing at least three sessions that cooperate to secure the connection from the user to the remote computer system on the network—session that communicates to the computer system, that could be an internet site, with the legacy standard communication, and two sessions, one with the legacy computing system and the other with the computing device that are split into two sessions in the direction from the computing device to the user (legacy computing system with attached computing device) and merged into one when coming from the user to the computing system on the network.

Communication between computing devices of two legacy computing systems with attached computing devices, allow for secured transfer of information and acknowledges between the devices. Information stored in a device or inputted to a device is safely transferred between the computing systems devices.

The computing device may support sensitive information protection of any nature as a character string or 2D image, such as credit cards details or face picture.

In certain embodiments the computing device may be designed to support various modes of operation.

The computing device mode of operation may be selected by the user supporting various actions: Transfer of information directly to the secured computing system without delivery to the legacy computing system—such as credit card, social security number, etc.—download mode that allow the computing device modify content of memory with data received from the secured computing system and any special operation that is desired by the user and will be implemented by the user. Such action is not reputable by the user—he specifically needs to activate it and malware is not capable to initiate it.

The computing device may communicate with several secured computing systems,

The computing device may be incorporated in input devices such as keyboard, cameras, and routers. The input devices with such computing device incorporated may have input interfaces to allow other I/O devices to be attached to the input device and through it communicate with legacy computing systems.

What follows are exemplary embodiments of invention:

A computing device, comprising a processor, memory, and interface devices that allow: an I/O device communication with a legacy computing system via the computing device; and communication of the computing device with the legacy computing system; and communication to a network.

Wherein program applications of the computing device that utilize sensitive information are only executed from within the computing device.

Wherein the device stores an identification object by means of the I/O device connected directly to it.

The computing device according to compares stored data in the device against input from at least one I/O device connected to it and acts on it.

The computing device communicates with another computing system on the network.

The computing device blocks or transfers a string of characters to the legacy computing system, emulating a peripheral input.

The computing device communicates the identification object to a secured or non-secured computing system by means of the network.

The computing device allow for safe home automation system access while using the legacy computing system.

The computing device allows for detection, altering, and seeding of sensitive information transferred to the legacy computing system.

The legacy computing system allow user communication with the secured computing system by means of I/O devices connected directly to the legacy computing system allowing for authentication.

The computing device allow for communication with the secured computing system by means of I/O devices for authentication.

The Computing device may have I/O means.

A secured computing system on the network communicating with the computing device and the legacy computing system allowing a user of the legacy system to open an account.

The secured computing system allows the user of the legacy system for remote interfaces of other computing systems on the network.

The secured computing system process the information from the other computing systems, creating two separate communication channels, one to the computing device and the other to the legacy computing system.

The secured computing system allow for displaying information to the user by means of a browser running on the legacy computing system.

The secured computing system receives information from the computing device.

The secured computing system compares the information received from the computing device against information received from other computing systems on the network.

The computing system acts on the comparison results and activates applications to defeat hacking attempts and identify hackers.

The secured computing system provides services to the user of the legacy computing system.

A secured computing system serving as a remote PC to allow a user of a computing device and a legacy computing system to access a site protected by a password and additional authentication means.

Monitor by secured computing system—legacy or trusted source of identification. Use cam and mic and other biometric, etc. Could be also communicated directly from trusted.

LEDs and switches added to trusted device as means of communication to the user, Two IPs, single session, single user—trusted and legacy parallel communication through at least two different IPs allow for secured data and non-secured one interact (input or output) to achieve one task, such as access to an account and action taken.

Account access verification by continuous comparison of trusted keyboard strokes and Legacy character list—user name, account number, amount to be transferred—may be modified for the legacy and both original and modified transferred to the legacy.

Communication from a trusted environment to a remote trusted environment allowing a user access to secured user information remotely from an "unsafe" computer. A memory storage may be attached to the remote trusted device.

Other information, such as credit card, may be also protected by the security device.

A mode of operation, selected by user, that allows transfer of information to the secured site directly without transfer to the host system.

The computing device may communicate with multiple secured computing systems.

The computing device may be incorporated within input devices.

Usage of a computing device in a preferred embodiment:
Account setup:
10. Go to site with legacy and "add-on"
11. Use option open account
12. Site recognizes two IPs
13. Request PW setup—from "add-on" only. Account name may be protected as well.
14. Display on legacy without keyboard details but with site requests
15. Store on card/dongle/add-on/trusted environment: URL, Account name-#, PW. On legacy you could also use/store URL in favorites.
16. "Complicate" PW with card random generation—orchestrate with site.
17. Site (could be multiple "sites") keeps copy of PW combined and portions Operation:
18. Login to site: Display on legacy, response from trusted
19. All KB strokes checked by trusted identifying PW/Account—block from legacy.
20. If no communication with appropriate site—malware suspected.
21. User warns—reaction teach about malware operation/features/sophistication
22. Seeding a "PW" "keyed" by trusted to the malware—Machine/user/time encoded Only the secured site in the secured computing system is allowed to install programs to trusted environment of the computing device.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a Compact Disk-Read Only Memory (CD-ROM) disk, digital video disk (DVD), any other optical medium, any other physical medium with patterns of marks or holes, a RAM, a PROM, an Erasable Programmable Read Only Memory (EPROM), an Electrically Erasable Programmable Read Only Memory (EEPROM), a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations can be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It can be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A device comprising:
   a trusted environment including a hardware computing device, including a processor or a memory;
   the hardware computing device connected to and communicating with an untrusted environment legacy computing system, the untrusted environment legacy computing system including any of a computer, a notebook, a tablet, a smartphone, or a server;
   the hardware computing device connected directly to a network;
   a secured input device, or a secured output device communicating with the hardware computing device;
   the untrusted environment legacy computing system not communicatively coupled to the secured input device, or the secured output device;
   corresponding network communications received by the hardware computing device not accessible by the untrusted environment legacy computing system;
   the hardware computing device supporting security functions including any of authentication, storing sensitive information, detecting character strings, seeding, encryption, decryption, or sending data to the untrusted environment legacy computing system; and
   the hardware computing device having a mode of operation of any of selected by a user, selected by a secured computing system, or selected by another hardware computing device.

2. The hardware computing device according to claim 1, wherein the hardware computing device is incorporated into any of a keyboard, a camera, a router, an input device, an output device, or an interface to an input or output device.

3. The incorporated hardware computing device according to claim 2, further comprising a central processing unit executing a program application that utilizes sensitive information that is only executed from within the incorporated hardware computing device.

4. The device of claim 1, further connected to a secured computing system comprising a processor and a memory;
   the secured computing system communicating with a hardware computing device;
   the secured computing system communicating with a legacy computing system;
   the secured computing system supporting functions of authentication, protecting user data received from the hardware computing device, or malware detection.

5. The secured computing system according to claim 4, wherein the secured computing system serving as a remote personal computer to allow a user of the hardware computing device and the legacy computing system to access internet sites.

6. The secured computing system according to claim 4, wherein evaluation of legacy computing system against hardware computing device is carried out continuously in real time.

7. The secured computing system according to claim 4, wherein the legacy computing system presents to the user information communicated from the secured computing system.

* * * * *